US005893708A

United States Patent [19]

Nelson, II

[11] Patent Number: 5,893,708
[45] Date of Patent: *Apr. 13, 1999

[54] ROTATING PISTON FOR BALL AND SEAT VALVE ASSEMBLY AND DOWNHOLE PUMP UTILIZING SAID VALVE ASSEMBLY

[76] Inventor: Joe A. Nelson, II, 6111 Allentown, Spring, Tex. 77389

[*] Notice: This patent is subject to a terminal disclaimer.

[21] Appl. No.: 08/784,600

[22] Filed: Jan. 21, 1997

Related U.S. Application Data

[63] Continuation-in-part of application No. 08/625,205, Apr. 1, 1996, Pat. No. 5,628,624, which is a continuation-in-part of application No. 08/416,627, Apr. 5, 1995, Pat. No. 5,533,876.

[51] Int. Cl.[6] ........................................... F04B 53/12
[52] U.S. Cl. ..................... 417/456; 417/507; 417/554; 92/173; 137/512.3
[58] Field of Search ...................... 92/173; 417/456, 417/507, 554; 137/512.3

[56] References Cited

U.S. PATENT DOCUMENTS

| 880,019 | 2/1908 | Futhey | 417/554 |
|---|---|---|---|
| 1,026,873 | 5/1912 | Locke | 92/173 |
| 1,201,543 | 10/1916 | Becker | 92/173 |
| 1,278,769 | 9/1918 | Shutt | 92/173 |
| 1,513,985 | 11/1924 | Gunn et al. | 137/533.13 |
| 1,585,544 | 5/1926 | Hubbard | 417/511 |
| 1,784,602 | 12/1930 | Kirkpatrick | 417/511 |
| 2,005,299 | 6/1935 | Penrod | 417/459 |
| 2,344,786 | 3/1944 | Patterson et al. | 417/507 |
| 2,933,050 | 5/1960 | Crowl et al. | 103/179 |
| 3,023,710 | 3/1962 | Tyree, Jr. | 103/153 |
| 3,139,039 | 6/1964 | Adams | 103/179 |
| 3,612,101 | 10/1971 | Pavlovich | 137/614.2 |
| 3,697,199 | 10/1972 | Spears | 417/496 |
| 4,395,204 | 7/1983 | Turner | 417/456 |
| 4,531,896 | 7/1985 | Spears | 417/456 |
| 4,534,715 | 8/1985 | Jones | 417/456 |
| 4,599,054 | 7/1986 | Spears | 417/456 |
| 4,691,735 | 9/1987 | Horton | 137/494 |
| 4,741,679 | 5/1988 | Blassingame | 417/554 |
| 4,781,547 | 11/1988 | Madden | 417/444 |
| 4,848,454 | 7/1989 | Spears | 166/108 |
| 5,108,272 | 4/1992 | Brewer et al. | 417/520 |
| 5,178,184 | 1/1993 | Skillman | 137/533.13 |
| 5,382,142 | 1/1995 | Spears | 417/555.2 |
| 5,533,876 | 7/1996 | Nelson, II | 417/456 |
| 5,628,624 | 5/1997 | Nelson, II | 417/456 |
| 5,660,534 | 8/1997 | Snow | 417/554 |

FOREIGN PATENT DOCUMENTS

545389  2/1932  Germany ................. 417/444

Primary Examiner—Timothy S. Thorpe
Assistant Examiner—Ehud Gartenberg
Attorney, Agent, or Firm—J. M.(Mark) Gilbreth; Robert W. Strozier; Gilberth & Strozier, P.C.

[57] ABSTRACT

Disclosed is an assembly for unseating a seated traveling valve ball, and pumps utilizing such an assembly. The assembly generally includes a tubular member having therein a piston with an actuator for engaging the ball. Mechanical advantage is provided either by providing a sealing area of the piston that is greater than the sealing area of the seat valve and/or by providing a engaging member suitable to strike to seated ball asymmetrically with respect to the vertical axis through the center line of the ball.

40 Claims, 20 Drawing Sheets

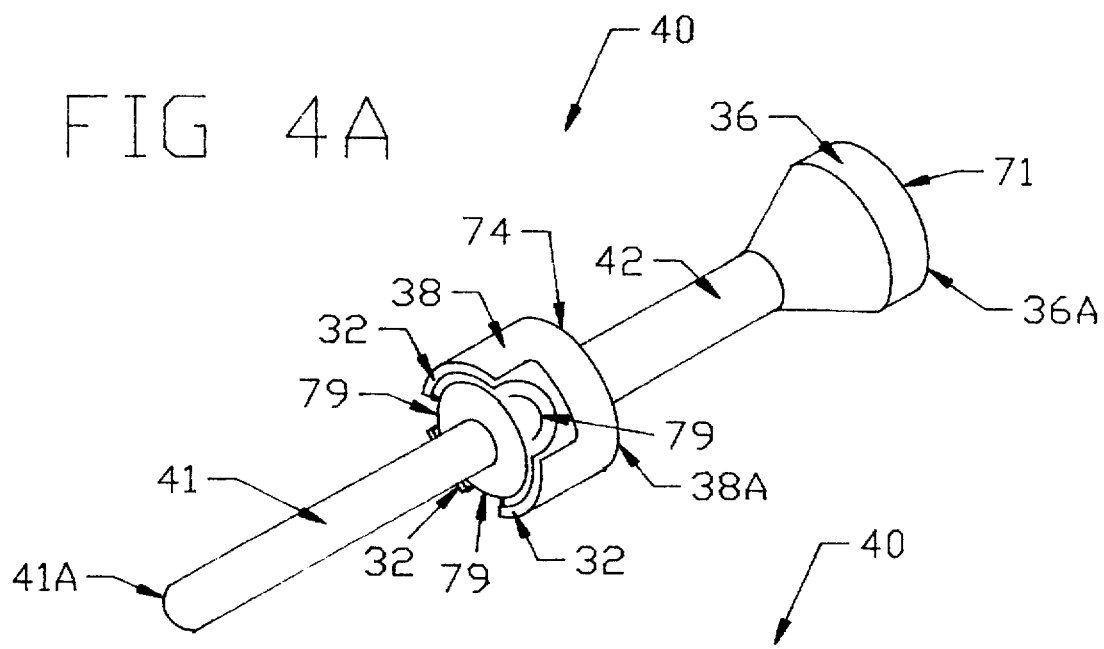
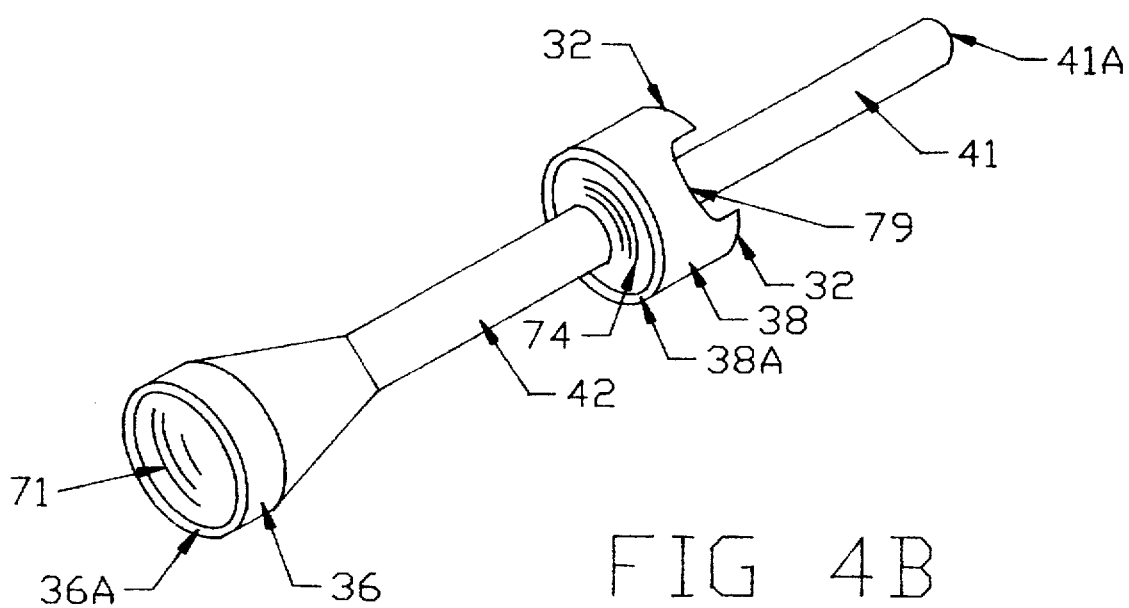

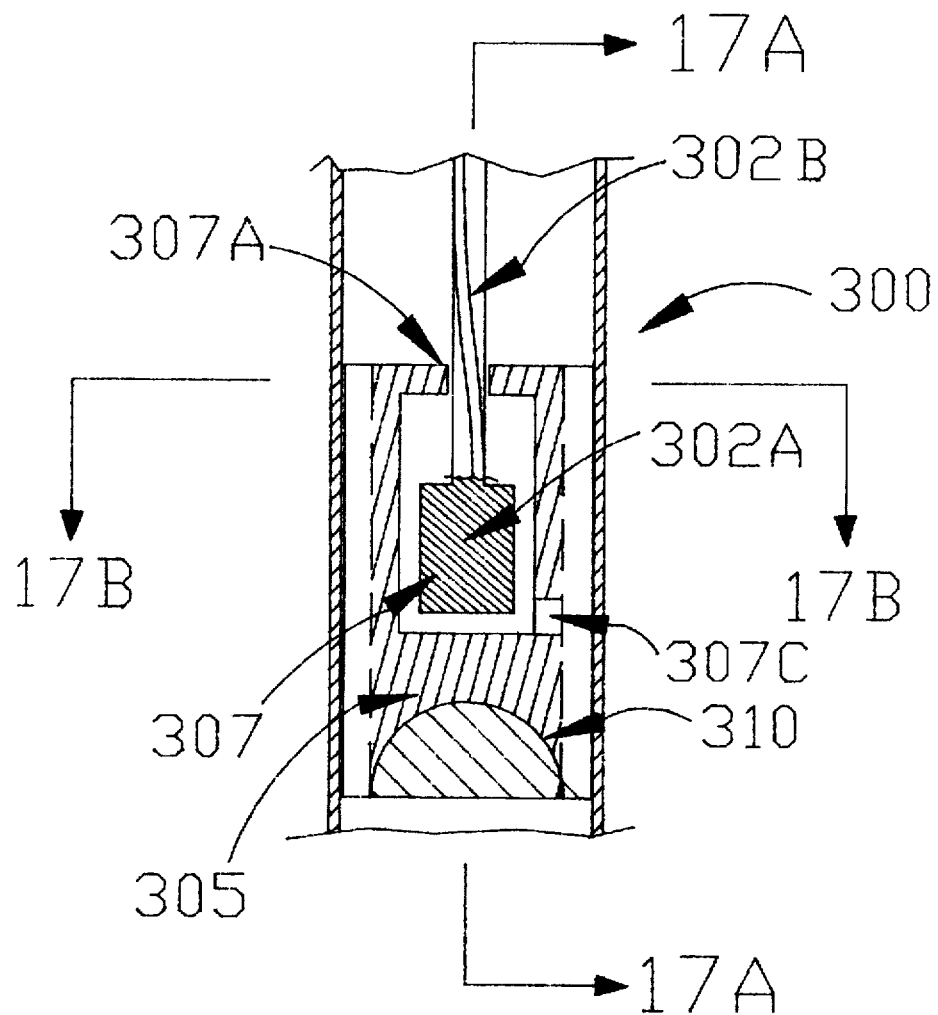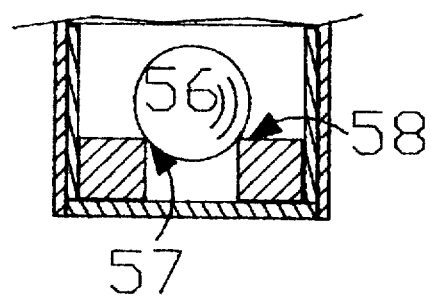
Fig. 16

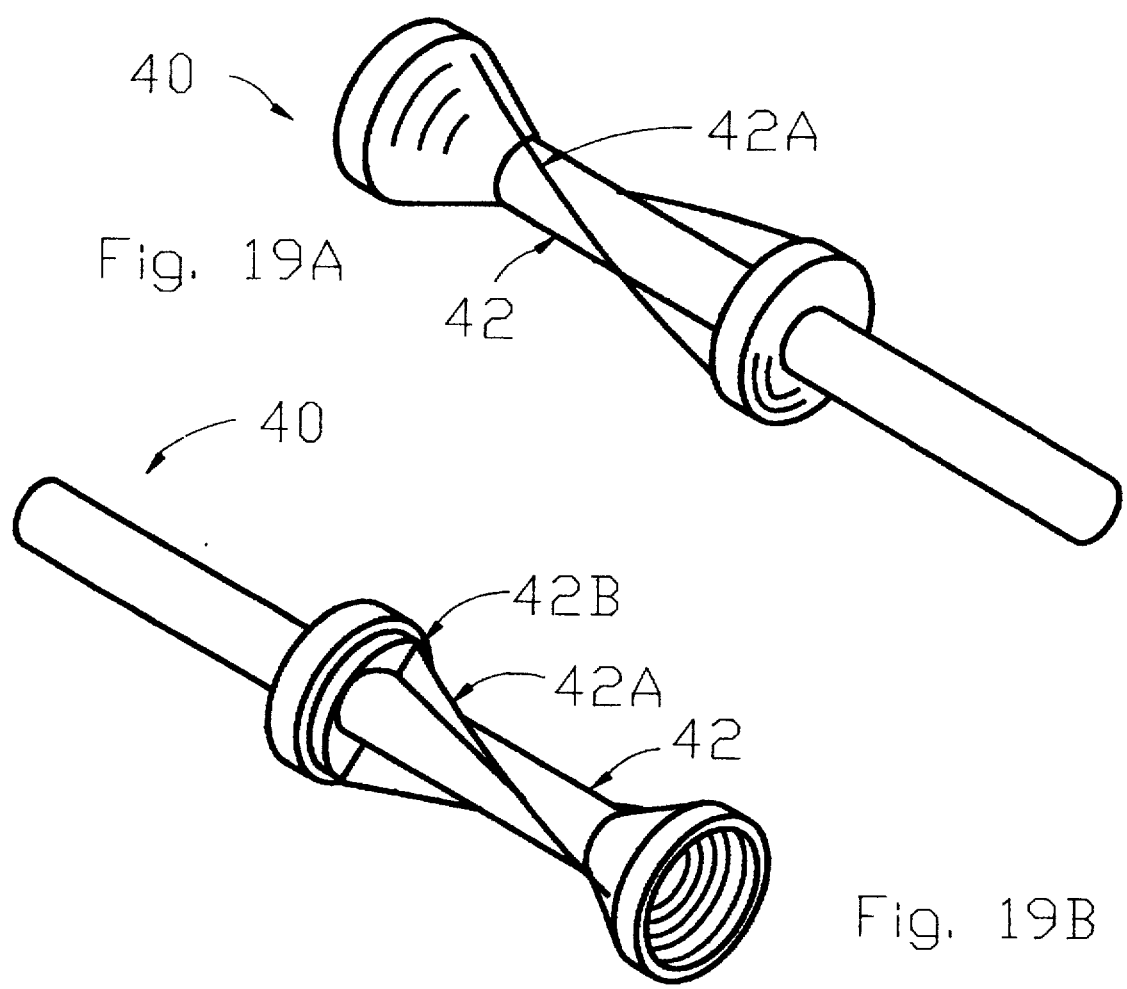

5,893,708

1

ROTATING PISTON FOR BALL AND SEAT VALVE ASSEMBLY AND DOWNHOLE PUMP UTILIZING SAID VALVE ASSEMBLY

RELATED APPLICATION DATA

This application is a Continuation-In-Part application of U.S. patent application Ser. No. 08/625,205, filed Apr. 1, 1996 now issued as U.S. Pat. No. 5,628,624, which is a Continuation-In-Part of U.S. patent application Ser. No. 08/416,627, filed Apr. 5, 1995, now issued as U.S. Pat. No. 5,533,876

BACKGROUND OF THE INVENTION

1. Field of the Invention

The present invention relates to valves and pumps. In another aspect, the present invention relates to ball and seat valves, and to pumps utilizing said valves. In even another aspect, the present invention relates to ball and seat valves utilizing a piston mechanism to unseat the ball from the seat, and to downhole pumps utilizing said valves.

2. Description of the Related Art

In the production of hydrocarbons from subterranean formations, it is desirable that the pressure of the formation "produce" or force the hydrocarbons to the surface. Unfortunately, sometimes formation pressure may be initially too low to produce the formation, or may decline to that point as hydrocarbons are produced from a formation. Resort must then be made to the use of a pump to produce the formation.

Most commonly in petroleum production technology, producing wells utilize a so called "sucker rod" to lift oil from subterranean formations to the surface of the earth. Sucker rod pumps are generally either a rod pump or a tubing pump. Tubing pumps are constructed such that the barrel assembly is an integral part of the tubing string and such that the plunger assembly is part of the rod string. Rod pumps, however, are of the stationary barrel traveling plunger type, wherein the barrel assembly is wedged into the seating nipple at the bottom of the tubing, thus providing a seal point.

In general a sucker rod pump is a reciprocating pump which is normally secured to the lowermost end of the sucker rod string, which extends longitudinally through the well bore from a reciprocating device at the surface of the ground. The reciprocating device at the surface is usually a horsehead type apparatus and alternatively raises and lowers a string of sucker rods in the well bore.

The sucker rod pump itself generally includes a housing through which a piston is reciprocated by the sucker rod linkage. In its simplest form, the pump usually includes a number of ball and seat valves with one such valve in the piston and another at the inlet port of the housing. On the upstroke of the plunger, the ball in the inlet port valve ("standing valve") is drawn away from its seat and the ball of the outlet port valve ("traveling valve") is forced over its seat to draw fluid from below the seating nipple and into the housing. On the piston's downstroke, the ball in the standing valve is forced into its seat and the ball in the traveling valve moves away from its seat to allow the piston to move downwardly through the fluid contained in the housing. On the subsequent upstroke, the closing of the traveling valve forces the fluid above the piston, out of the housing through the outlet ports and into the tubing above the pump and simultaneously fills the housing below the piston with fluid. Repetition of this cycle eventually fills the tubing string and causes the fluid to flow to the surface.

2

One problem encountered by sucker rod pumps is caused by the wear of the ball and seat valves. The fluid produced from many geological formations contains minute, abrasive particles, such as sand, which lodge between the ball and seat and wear away the valve components. Over a period of time, the sealing efficiency of the valves is reduced to such an extent that the pump must be removed and repaired or replaced. In some wells, where the production fluid is particularly sandy or corrosive, these pumps must be replaced at frequent intervals. It is, of course, evident that removing and repairing or replacing a pump, and the associated losses of lost production time during the repair or replacement process, can be significant expense factors.

Another problem associated with such conventional ball and valve sub-surface oilfield pumps is generally known as "gas locking". In such pumps, the fluid head pressure in the tubing string is held by the traveling valve, on the upstroke of the piston, and by the lower standing valve on the downstroke of the piston. The down stroke of the traveling valve builds up pressure on the fluid between the traveling valve and the standing valve which causes the traveling valve to open to allow fluid to pass above the traveling valve. However, in a well producing both oil and gas, the chamber between the traveling valve and the standing valve, frequently fills with gas, and due to the compressibility of gas, the downstroke of the traveling valve may not build up sufficient pressure in the chamber below the traveling valve to act upwardly on the ball of the traveling valve to overcome the immense pressure of the fluid column above the traveling valve which acts downwardly on the ball of the traveling valve, resulting in the ball of the traveling valve remaining in the closed seated position during the downstroke. Thus, the gas between the standing valve and the traveling valve merely compresses and expands with each stroke of the pump, producing the operational failure of the pump known as "gas locking". This condition may remedy itself after a short time or may continue indefinitely.

Even another problem associated with such conventional ball and valve sub-surface oilfield pumps is generally known as "fluid pounding." This fluid pounding occurs when the pump does not fill completely with liquid during the upstroke, resulting in the formation of a low pressure gas cap in the top of the pump chamber between the traveling valve and the standing valve. During the subsequent downstroke the traveling valve stays closed until it impacts the fluid.

There has been a long felt need to solve the above described problems associated with such conventional ball and valve sub-surface oilfield pumps, and the art is replete with attempts to solve one or more of the above problems.

U.S. Pat. No. 1,585,544, issued May 18, 1926 to Hubbard, discusses the problem of "air hammering", and suggests the use of a rod mounted on the standing valve which impacts the ball of the traveling valve as the traveling valve is moved toward the standing valve. However, given the expansion and contraction of the sucker rods, the traveling valve may not reach the rod, or may extend past the rod, damaging the valve.

U.S. Pat. No. 4,691,735, issued Sep. 8, 1987 to Horton, discloses a traveling valve for an oil well pump, which includes a piston below the traveling valve which lifts the traveling valve ball above the traveling valve seat. On the downstroke, pressure builds up between the standing valve and the piston, to force the piston upward to lift the ball. However, since the piston cross-sectional area affected by the pressure between the standing valve and the piston is equal to the cross-sectional area of the traveling valve seat, no mechanical advantage is provided by the arrangement of Horton. Thus, Horton suffers from "gas locking" to the same extent as conventional traveling valves. Additionally, the Horton traveling valve and the rod assembly are not mounted below the bottom of the plunger, and thus must be made of materials strong enough to withstand the rigors of operation of the pump.

U.S. Pat. No. 4,781,547, issued Nov. 1, 1988 to Madden, discloses a pushrod assembly mounted below the traveling valve, which pushrod is alternatively moved from an extended into a retracted position each upstroke and downstroke of the pump. The free terminal end of the pushrod is arranged to engage the traveling valve ball as the pump commences the downstroke. However, since the bottom of the pushrod includes several channels, pressure does not build up between the pushrod and the standing valve during the downstroke. Rather, during the downstroke liquid is forced through the channels in the bottom of the pushrod. Movement of the pushrod is affected by inertia, pressure differential of the liquid flow through the channels, and friction between the pushrod and the pump barrel.

Therefore, there is a need in the art for an improved downhole reciprocating pump.

There is another need in the art for an improved apparatus for moving the traveling valve ball during the downstroke of a downhole reciprocating pump.

These and other needs in the art will become apparent to those of skill in the art upon review of this patent specification, claims and drawings.

SUMMARY OF THE INVENTION

It is an object of the present invention to provide an improved downhole reciprocating pump.

It is another object of the present invention to provide for an improved apparatus for moving the traveling valve ball during the downstroke of a downhole reciprocating pump.

These and other objects of the present invention will become apparent to those of skill in the art upon review of this patent specification, claims and drawings.

According to one embodiment of the present invention there is provided a ball and seat valve assembly which generally includes a hollow tubular member holding a ball and valve. Mounted within the tubular member by below valve seat is a piston with an actuator for engaging the seated ball. Mechanical advantage is provided either by providing a sealing area of the piston that is greater than the sealing area of the seat valve and/or by providing an actuator suitable to strike the seated ball asymmetrically with respect to the vertical axis through the center line of the ball. Surface indentations or extensions are provided along the surface of the piston to urge rotation of the piston as it travels.

According to another embodiment of the present invention there is provided a ball and seat assembly which generally includes a ball and seat valve. Mounted to the bottom of the valve is a tubular member having therein a piston with an actuator for engaging the seated ball. Mechanical advantage is provided either by providing a sealing area of the piston that is greater than the sealing area of the seat valve and/or by providing an actuator suitable to strike the seated ball asymmetrically with respect to the vertical axis through the center line of the ball. Surface indentations or extensions are provided along the surface of the piston to urge rotation of the piston as it travels.

According to even another embodiment of the present invention there is provided a ball and seat assembly which generally includes a first tubular member containing a ball and seat valve. Mounted to the bottom of the first tubular member is a second tubular member having therein a piston with an actuator for engaging the seated ball. Mechanical advantage is provided either by providing a sealing area of the piston that is greater than the sealing area of the seat valve and/or by providing an actuator suitable to strike the seated ball asymmetrically with respect to the vertical axis through the center line of the ball. Surface indentations or extensions are provided along the surface of the piston to urge rotation of the piston as it travels.

According to still another embodiment of the present invention there is provided a pump assembly which generally includes a pump housing with a movable barrel positioned therein. Affixed to the barrel is a traveling ball and seat valve. Mounted to the bottom of barrel is a tubular member having therein a piston with an actuator for engaging the seated ball. Mechanical advantage is provided either by providing a sealing area of the piston that is greater than the sealing area of the seat valve and/or by providing an actuator suitable to strike the seated ball asymmetrically with respect to the vertical axis through the center line of the ball. Surface indentations or extensions are provided along the surface of the piston to urge rotation of the piston as it travels.

BRIEF DESCRIPTION OF THE DRAWINGS

FIGS. 4A and 4B are isometric views of piston 40 of the present invention, which is utilized for moving the ball from the traveling valve.

FIG. 16 is a view of weight/plunger system 300 showing fluid outlet 307C

FIG. 19A and FIG. 19B are an isometric view of piston 40 with actuator piston body 42A and reinforcement for upper valve 42B.

DETAILED DESCRIPTION OF THE INVENTION

Referring now to FIGS. 1A, 1B, 1C, 2, 3, 4A and 4B there is shown one embodiment of the present invention.

Figure 1A:
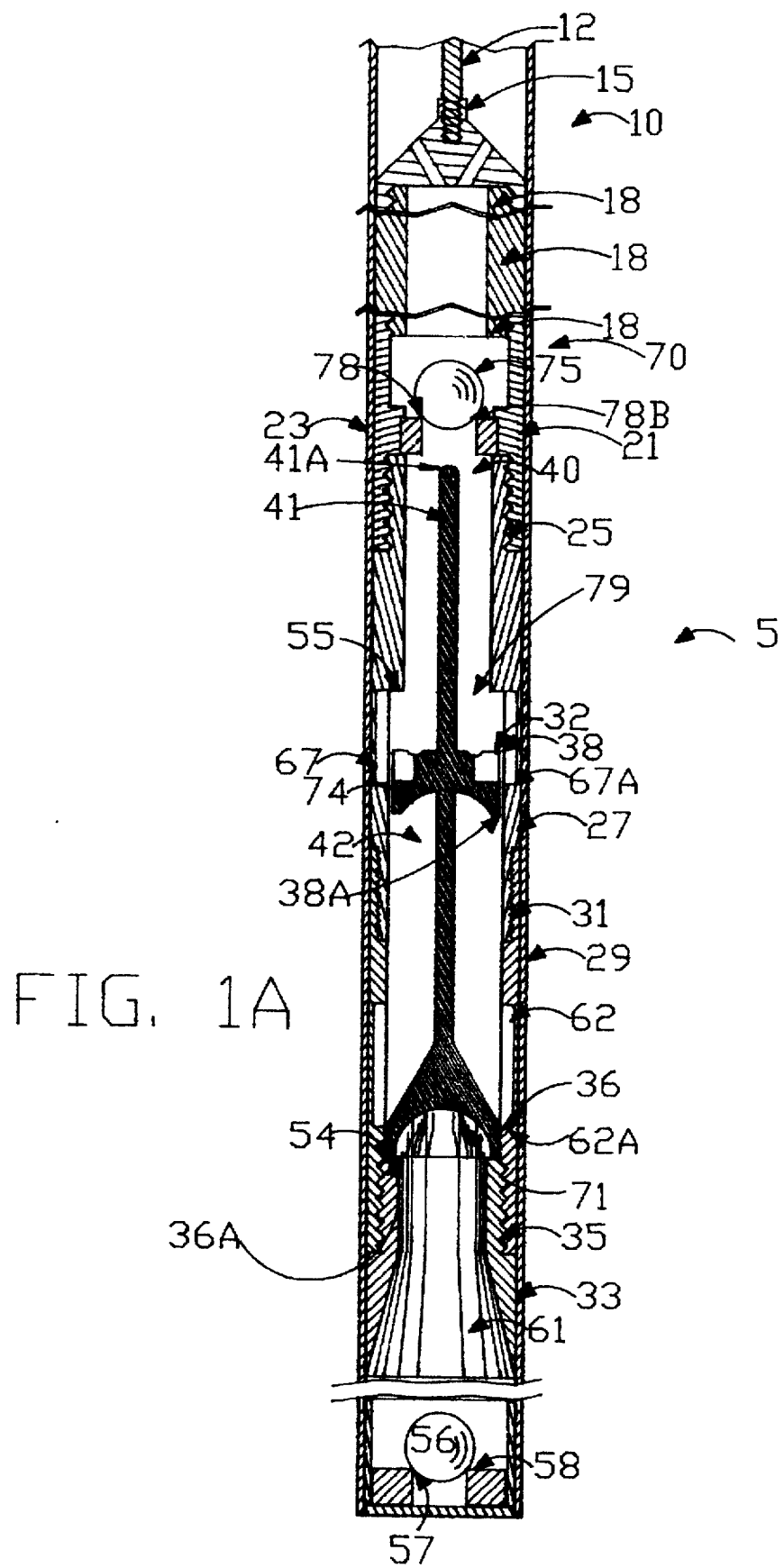
FIGS. 1A, 1B and 1C are cross-sectional views of reciprocating fluid pump 10 of the present invention showing piston 40 in a lower, intermediate and upper position, respectively.
Figure 1B:
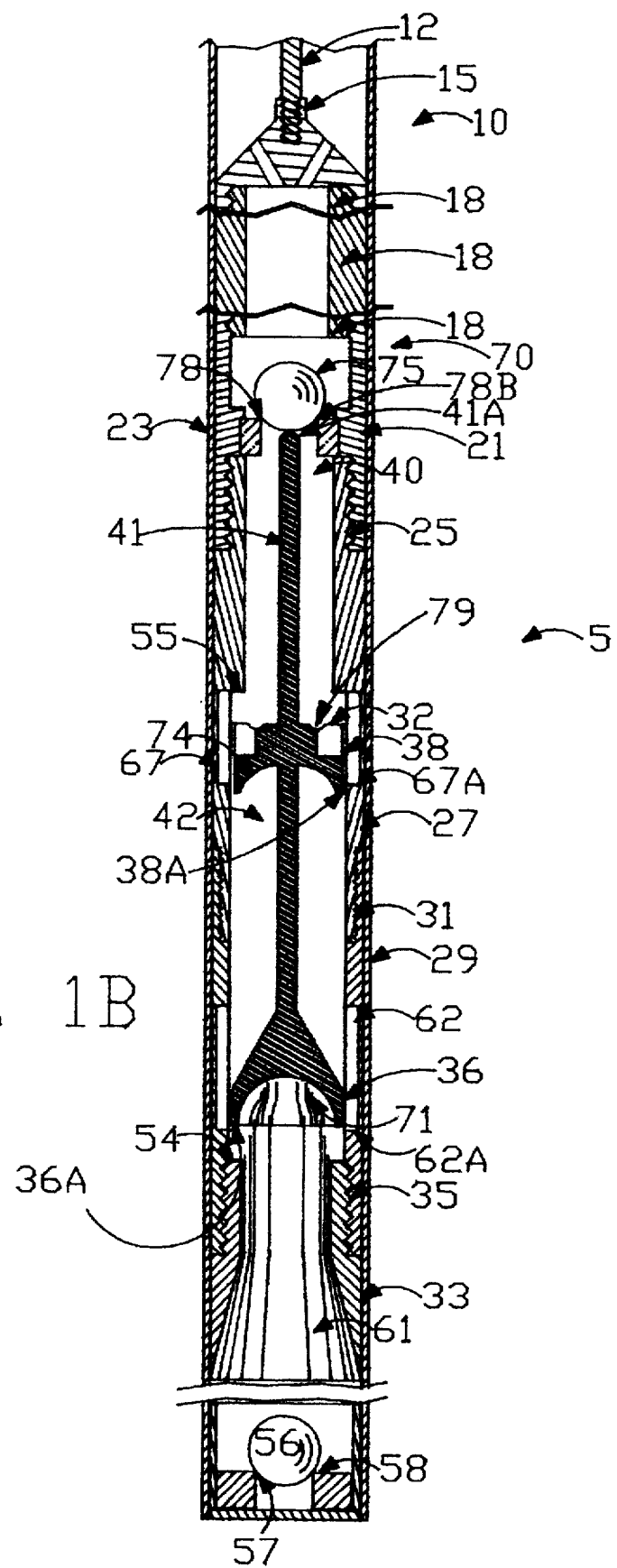
Figure 1C:
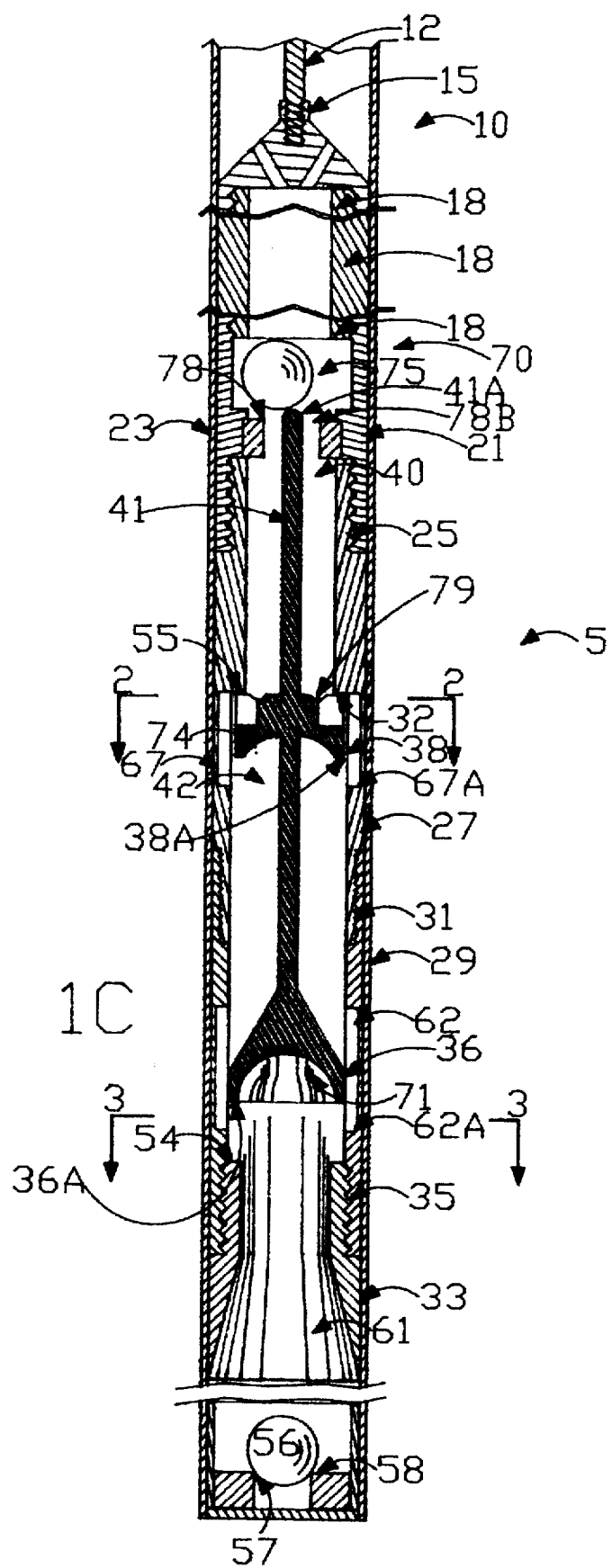

FIGS. 1A, 1B and 1C are cross-sectional views of reciprocating fluid pump 10 of the present invention showing piston 40 in a lower, intermediate and upper position, respectively.

Figure 2:
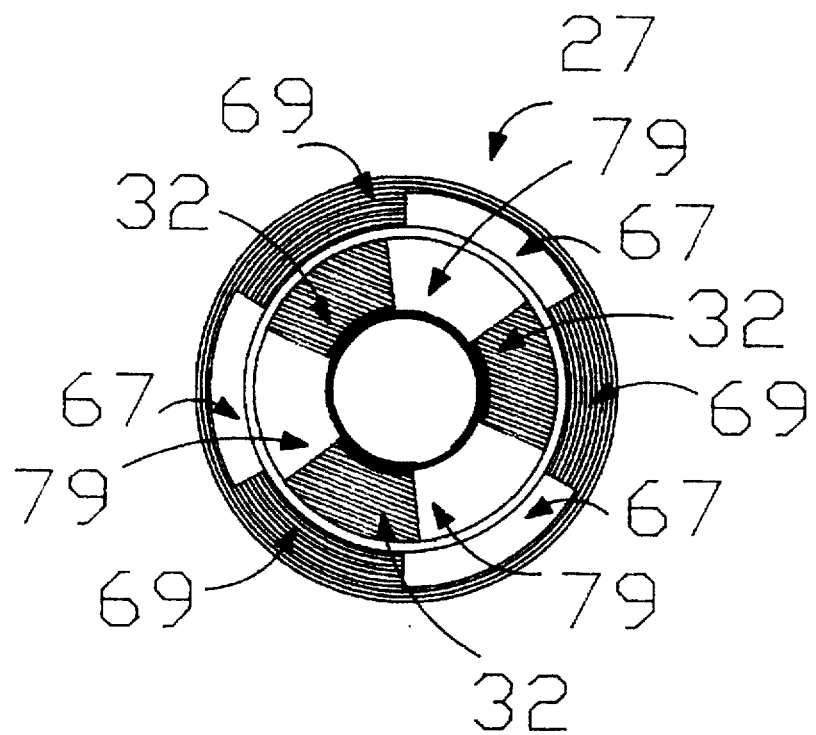
FIGS. 2 and 3 are horizontal cross-sectional views taken along FIG. 1 lines 2—2 and 3—3, respectively, of reciprocating fluid pump 10 of the present invention.
Figure 3:
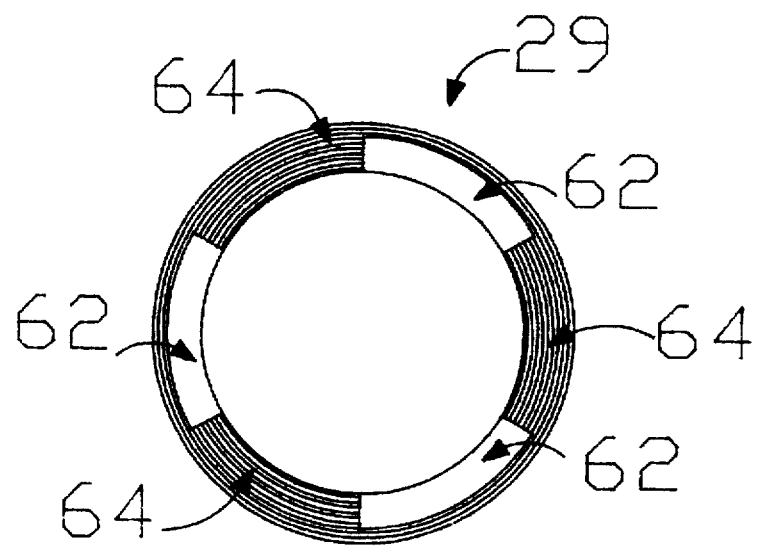

FIGS. 2 and 3 are horizontal cross-sectional views taken along line 2—2 and 3—3, respectively, of reciprocating fluid pump 10 of the present invention.

FIGS. 4A and 4B are isometric views of piston 40 of the present invention, which is utilized for moving the ball from the traveling valve.

Conventional sucker/pump rod 12 connects to reciprocating fluid pump 10 of the present invention via threaded connection to conventional plunger connector 15, which is in turn connected via threaded connection to conventional plunger 18, which is in turn connected via threaded connection to conventional traveling valve cage 21 of traveling valve 70 having seat 78 and ball 75, all of which is encased in conventional barrel 23.

It is to be understood that conventional sucker/pump rod 12 is actuated from the surface by any of the well known means, usually a "rocking horse" type pumpjack unit.

Threaded connection 25 joins traveling valve cage 21 with tubular housing 27, which extends downwardly to lower housing 29 by threaded connector 31. Housing 29 in turn extends downwardly and connects to housing 33 through threaded connector 35. It is to be understood that housings 27, 29 and 33 form hollow tubular housing assembly 5 of the present invention which is adapted for attachment to the traveling valve 70. While assembly 5 is illustrated as having three housings 27, 29 and 33, it is to be understood that the number of housings utilized is not critical, and that one or more housings can be utilized. Generally however, at least two housings are utilized to allow for easier insertion of piston 40 into housing assembly 5.

At the bottom of barrel 23 is positioned conventional standing valve 58, including conventional seat 57 and ball 56.

Piston 40 is positioned within tubular assembly 5 within pump 10 as shown, and includes actuator 41 having engaging end 41A, lower sealing member 36, upper sealing member 38, piston body 42.

The vertical motion of piston 40 in housing assembly 5 within pump 10 is restricted at its uppermost point by the engagement of upper stops 55 of housing 27 and shoulders 32 of upper sealing member 38 as shown in FIG. 1C, and at its lowermost point by engagement of lower stops 54 of housing 33 with bottom shoulder 36A of lower sealing member 36 as shown in FIG. 1A.

Liquid flow around lower sealing member 36 through channels 62 in housing 29 occurs once bottom shoulder 36A clears lower end 62A of channels 62. In the embodiment as shown in FIG. 3 channels 62 are not continuously connected around the perimeter of housing 29, but rather are spaced by guides 64 formed in the walls of housing 29. While three channels 62 are utilized in the embodiment of pump 10 shown, it is to be understood that any number of channels 62 may be utilized, as long as at least one channel 62 is provided. Thus, when bottom shoulder 36A is above lower channel end 62A, lower sealing member 36 is positioned in lower housing 29 by guides 64.

Liquid flow around sealing member 36 is prevented when bottom shoulder member 36A is positioned below lower channel member 62A. Sealing member 36 will form a seal with lower housing 29 such that pressure can be held by sealing member 36. Additional optional sealing can be provided by utilizing a sealing seat against which sealing member 36 will abut. In the embodiment shown in FIG. 1A, lower stop 54 is additionally a seal seat for sealing member 36. Thus, sealing is provided by sealing member 36 circumferentially abutting housing 29, and by the bottom of sealing member 36 abutting lower stop or seat 54.

Lower sealing member 36 includes sealing area 71 which may be any shape suitable to seal the internal cross-section of housing 29 below channel end 62A. In the embodiment shown, sealing area 71 is a concave shape, although any suitable shape may be utilized.

It is to be understood that in the event of fluid leakage past or failure of traveling valve 70, sealing member 36 may be designed suitable to provide backup sealing. It is also possible to eliminate traveling valve 70, and utilize sealing member 36 as the primary traveling valve.

Liquid flow around upper sealing member 38 through channels 67 in housing 27 occurs once bottom shoulder 38A clears lower end 67A of channels 67. In the embodiment as shown in FIG. 2 channels 67 are not continuously connected around the perimeter of housing 27, but rather are spaced by guides 69 formed in the walls of housing 27. While three channels 67 are utilized in the embodiment of pump 10 shown, it is to be understood that any number of channels 67 may be utilized, as long as at least one channel 67 is provided. Thus, when bottom shoulder 38A is above lower channel end 67A, lower sealing member 38 is positioned in housing 27 by guides 69.

With piston 40 at its uppermost point, with upper stops 55 of housing 27 and shoulders 32 of upper sealing member 38 in engagement, liquid flow will still occur around sealing member 38. Flow area 79 extends downwardly along the side of sealing member 38 as shown in FIGS. 4A and 4B to form a liquid passage with channel 67. Even when shoulder 32 is abutted against stop 55 this flow area 79 is in liquid communication with channel 67, and thus allows for passage of fluid from channel 67 and past sealing member 38 through flow area 79.

Liquid flow around sealing member 38 is prevented when bottom shoulder member 38A is positioned below lower channel member 67A. Sealing member 38 will form a seal with housing 27 such that pressure can be held by sealing member 38.

Sealing member 38 includes sealing area 74 which may be any shape suitable to seal the internal cross-section of housing 27 below channel end 67A. In the embodiment shown, sealing area 74 is a concave shape, although any suitable shape may be utilized.

This embodiment of the present invention is illustrated with two sealing members 36 and 38. It is to be understood that at the very least, one sealing member must be utilized, with additional sealing members being optional. However, one problem that must be addressed is the orientation of the piston 40. While one sealing member could be modified to keep piston 40 in its proper vertical alignment, it is preferred to utilize either a second sealing member, or a rod guide to keep piston 40 aligned properly.

It is important that the sealing area of the sealing member that holds pressure against standing valve 58, which in the embodiment shown is sealing area 71 of member 36 initially, and subsequently sealing area 74 of member 38, have a sealing area that is greater than the cross-sectional area of valve seat passage 78B. Preferably, the sealing area of sealing member 36 and/or 38 will be at least 1.1 times greater than the cross-sectional area of valve seat passage 78B, more preferably at least 2 times greater, even more preferably at least 5 times greater, even still more preferably at least 6 times greater, even yet more preferably at least 9 times greater, and most preferably at least 12 times greater.

While not wishing to be limited by theory, the inventor believes that the greater sealing area of sealing area 71 of member 36 or sealing area 74 of member 38 will provide a mechanical advantage over pressuring the seat alone as follows. Pressure acting on the seat alone will provide a force equal to the product of the pressure and the cross-sectional area of the seat. Pressure acting upon sealing area 71 of member 36 or sealing area 74 of member 38 will provide a force equal to the product of the pressure and the area of sealing area 71 or sealing area 74. Having a greater sealing area 71 or 74 for member 36 or 38 will provide a mechanical advantage for overcoming the fluid column force acting downwardly upon ball 75, requiring less pressure on sealing area 71 of member 36 or sealing area 74 of member 38 to ultimately unseat ball 75.

Operation of pump 10 is as follows. In the upstroke, sucker rod 12 driven by a surface pumping unit moves plunger 18, traveling cage 21 and tubular assembly 5 upward. This motion closes traveling valve 70, forces piston 40 into its downward position with shoulder 36A abutted against stop 54, and opens standing valve 58 and pulls liquid into conical area 61 of pump 10. On the downstroke, plunger 18, traveling cage 21 and tubular assembly 5 are driven downward thereby closing standing valve 58 and compressing the liquid drawn into area 61 between lower sealing member 36 and the now closed standing valve 58, see FIG. 1A. With the continuing downstroke, this pressure builds and acts upon sealing surface 71 of piston 40, ultimately driving it upward. Once shoulder 36A clears channel bottom 62A liquid flow bypasses sealing member 36 by passing through channel 62, see FIG. 1B. With piston 40 in this intermediate position, pressure is now being held by sealing member 38. With the continuing downstroke, this pressure builds and acts upon sealing surface 74 of piston 40, ultimately driving it upward. Once shoulder 38A clears channel bottom 67A, liquid flow goes around sealing member 38 through channels 67, and on through traveling valve 70. Piston 40 is ultimately driven to its upmost position with shoulder 32 of member 38 abutting stop 55, see FIG. 1C. At this point, liquid will continue to bypass sealing members 36 and 38 through channels 62 and 67, respectively, and on through traveling valve 70. This cycle is repeated with subsequent downstrokes and upstrokes.

Figure 5:
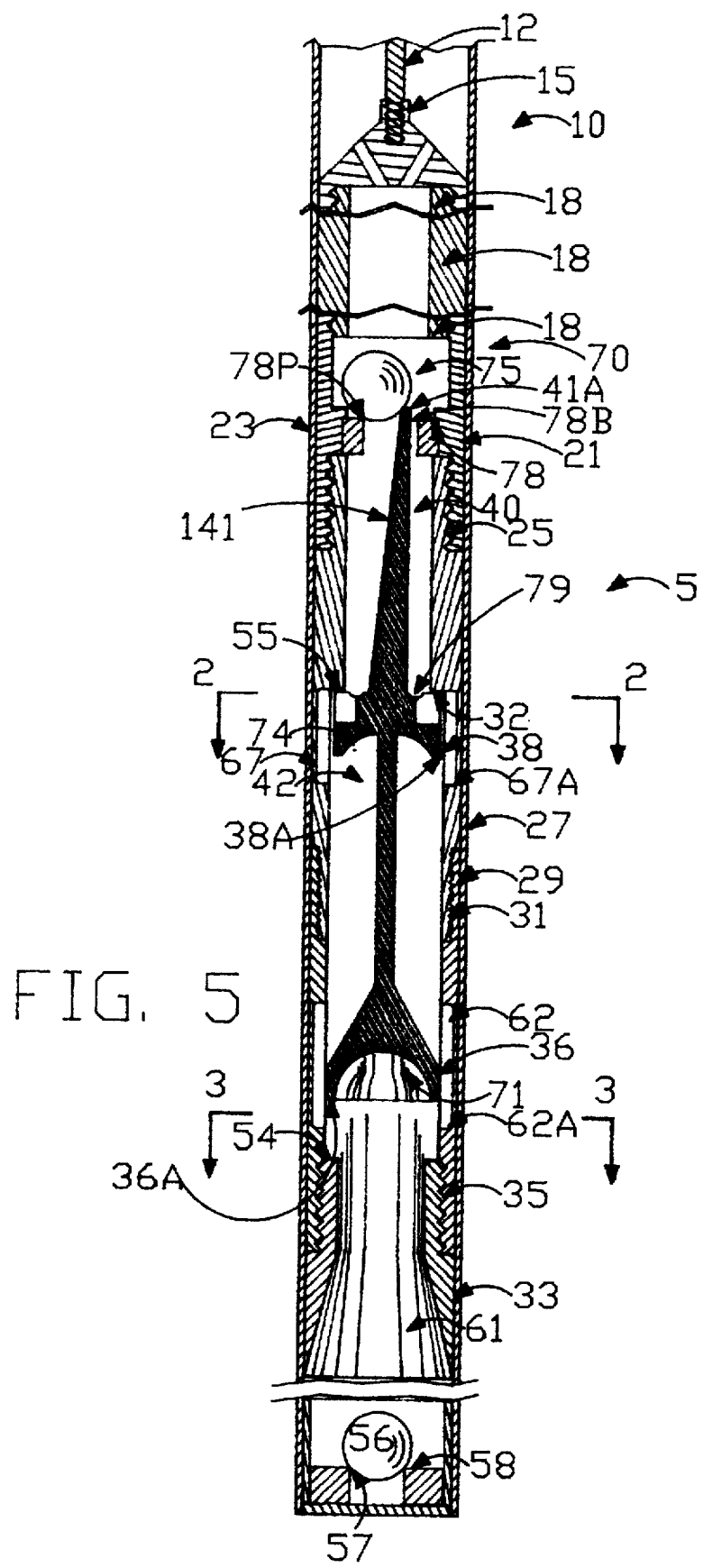
FIG. 5 shows pump 10 of FIG. 1 except that for piston 40, actuator 41 shown in FIG. 1 has been replaced by actuator 141.

Referring again to FIGS. 2 and 3 and additionally to FIG. 5, there is shown another embodiment of the present invention. The description for FIG. 1 above is applicable to FIG. 5 for like member numbers. FIG. 5 shows pump 10 of FIG. 1 except that for piston 40, actuator 41 shown in FIG. 1 has been replaced by actuator 141 as shown in FIG. 5. Instead of striking seated traveling valve ball 75 near its vertical center axis, actuator 141 will strike traveling valve ball 75 in a position off of its center axis as it is in its seated position. More specifically, actuator 141 must strike ball 75 to allow it to pivot on seat 78 at pivot point 78P. Even more specifically, actuator 141 will strike traveling valve ball 75 asymmetrically with respect to its vertical center axis as it is in its seated position. Such an asymmetrical striking will create a moment with respect to the vertical center axis causing ball 75 to pivot on seat 78 at pivot point 78P. With actuator 141, this asymmetrical striking is achieved by angling member 141.

While not wishing to be limited to theory, the inventor believes that this asymmetrical striking will create a moment that will allow the ball 75 to pivot on its seat 78 at point 78P. The inventor believes that this pivoting or prying action provides a mechanical advantage over merely forcing ball 75 in the vertical direction that will help to overcome the liquid column pressure acting downwardly on ball 75.

Figure 6:
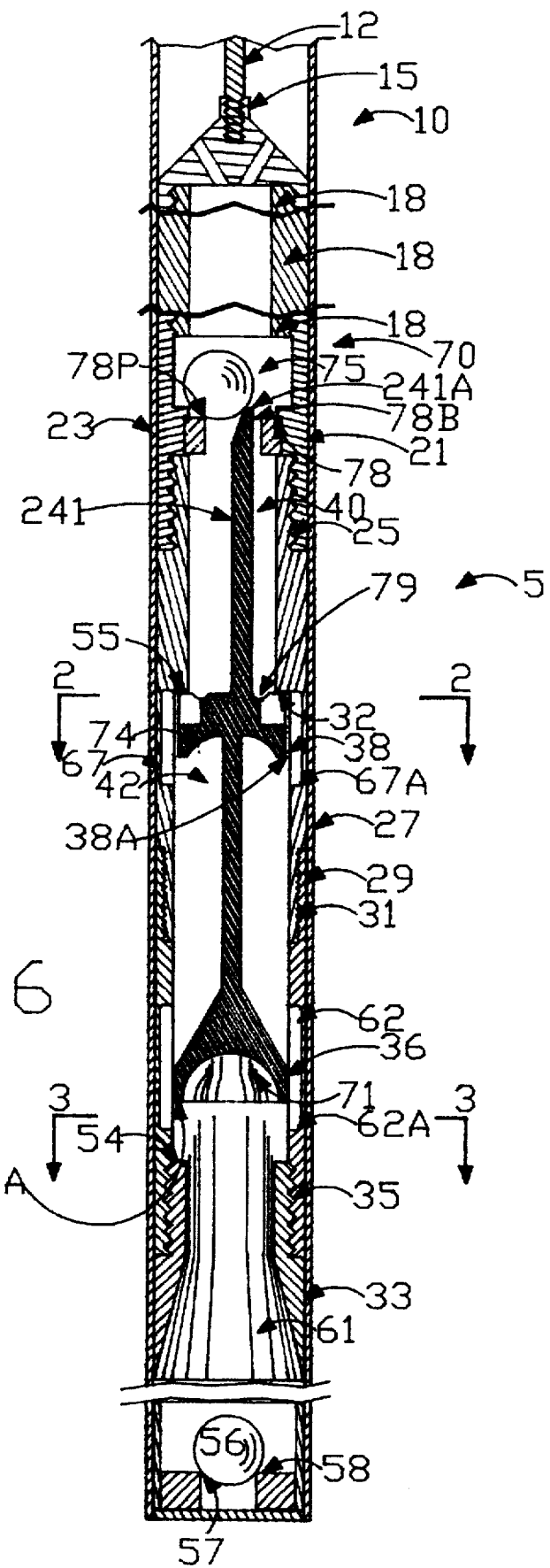
FIG. 6 shows pump 10 of FIG. 1 except that for piston 40, actuator 41 shown in FIG. 1 has been replaced by actuator 241 as shown in FIG. 5.
Figure 7:
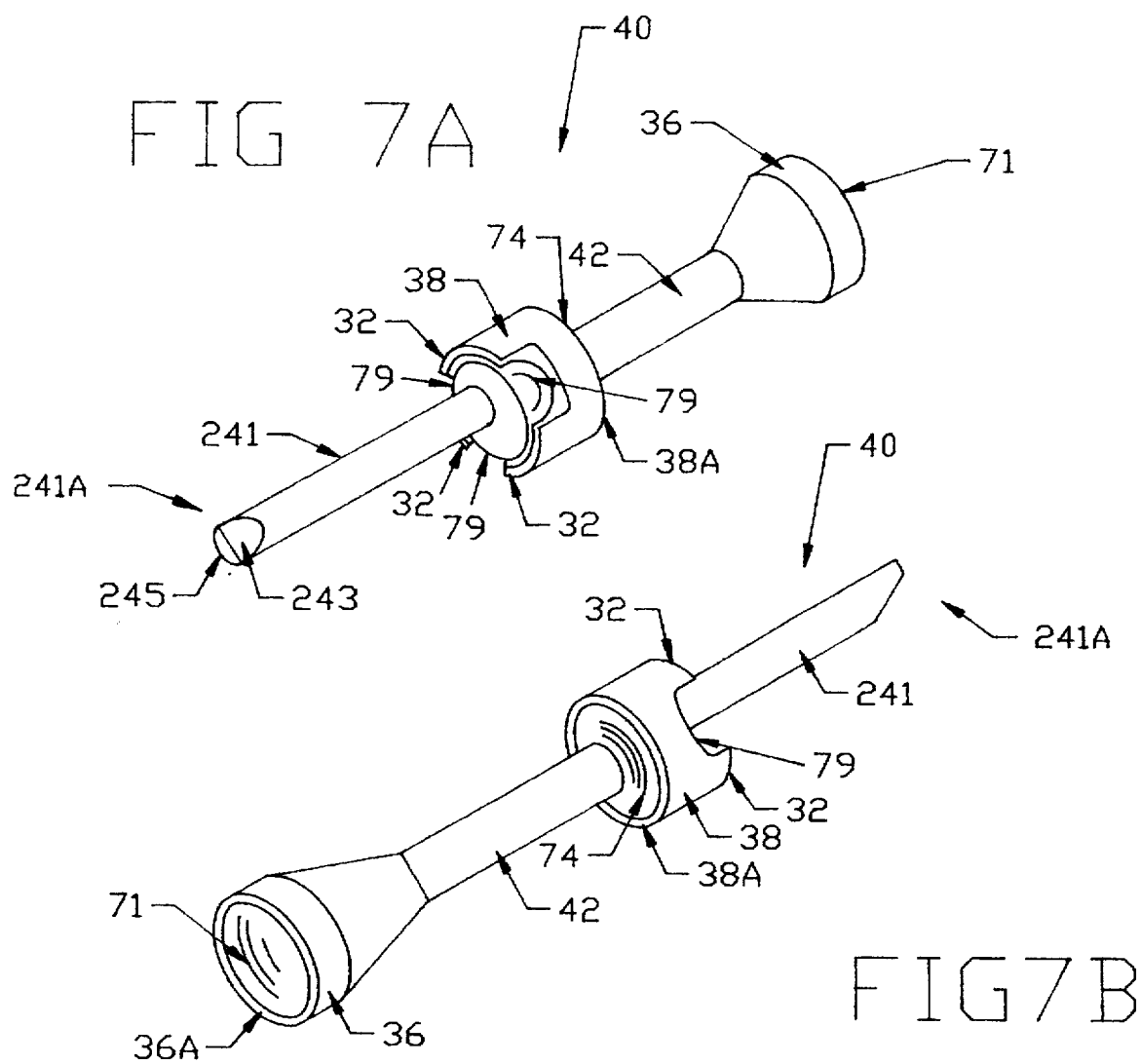
FIG. 7A an FIG. 7B is an isometric view of piston 40 with actuator 241.
Figure 8:
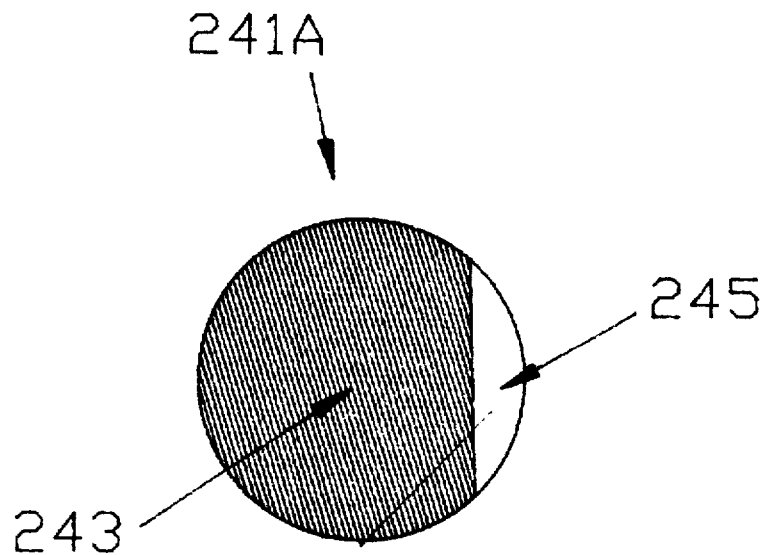
FIGS. 8 and 9 are top and side views, respectively, of end 241A of actuator 241, showing top end 245, striking face 243.
Figure 9:
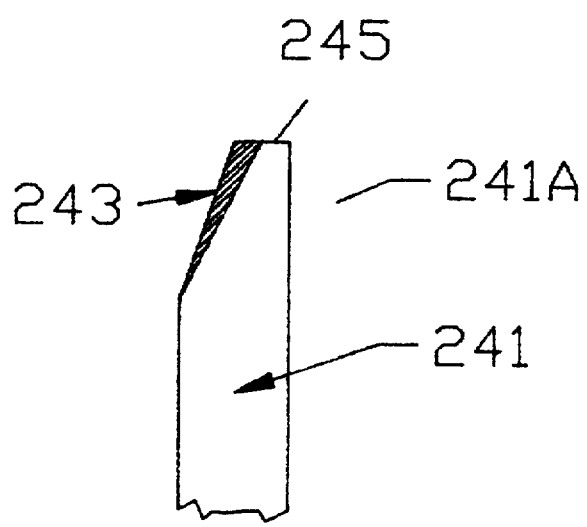

Referring again to FIGS. 2 and 3 and additionally to FIGS. 6, 7A, 7B and 8, there is shown even another embodiment of the present invention. The description above is applicable to FIGS. 6, 7A, 7B and 8, for like numbers. FIG. 6 shows pump 10 of FIG. 1 except that for piston 40, actuator 41 shown in FIG. 1 has been replaced by actuator 241 as shown in FIG. 6. FIG. 7A and FIG. 7B is an isometric view of piston 40 with actuator 241. FIGS. 8 and 9 are top and side views, respectively, of end 241A of actuator 241, showing top end 245, striking face 243.

Like the embodiment shown in FIG. 5, this embodiment utilizes an asymmetrically striking of ball 75. In this embodiment however, this asymmetrical striking is achieved by an actuator 241 that is offset from the vertical center line of pump 10.

Actuator 241 also employs a striking face 243 that is not only angled with respect to the vertical plane, it also is pitched with respect to the lateral plane. While not wishing to be limited by theory, the inventor believes that this angled and pitched striking face 243 provides additional prying or leveraging action to help unseat ball 75 from seat 78.

Figure 10:
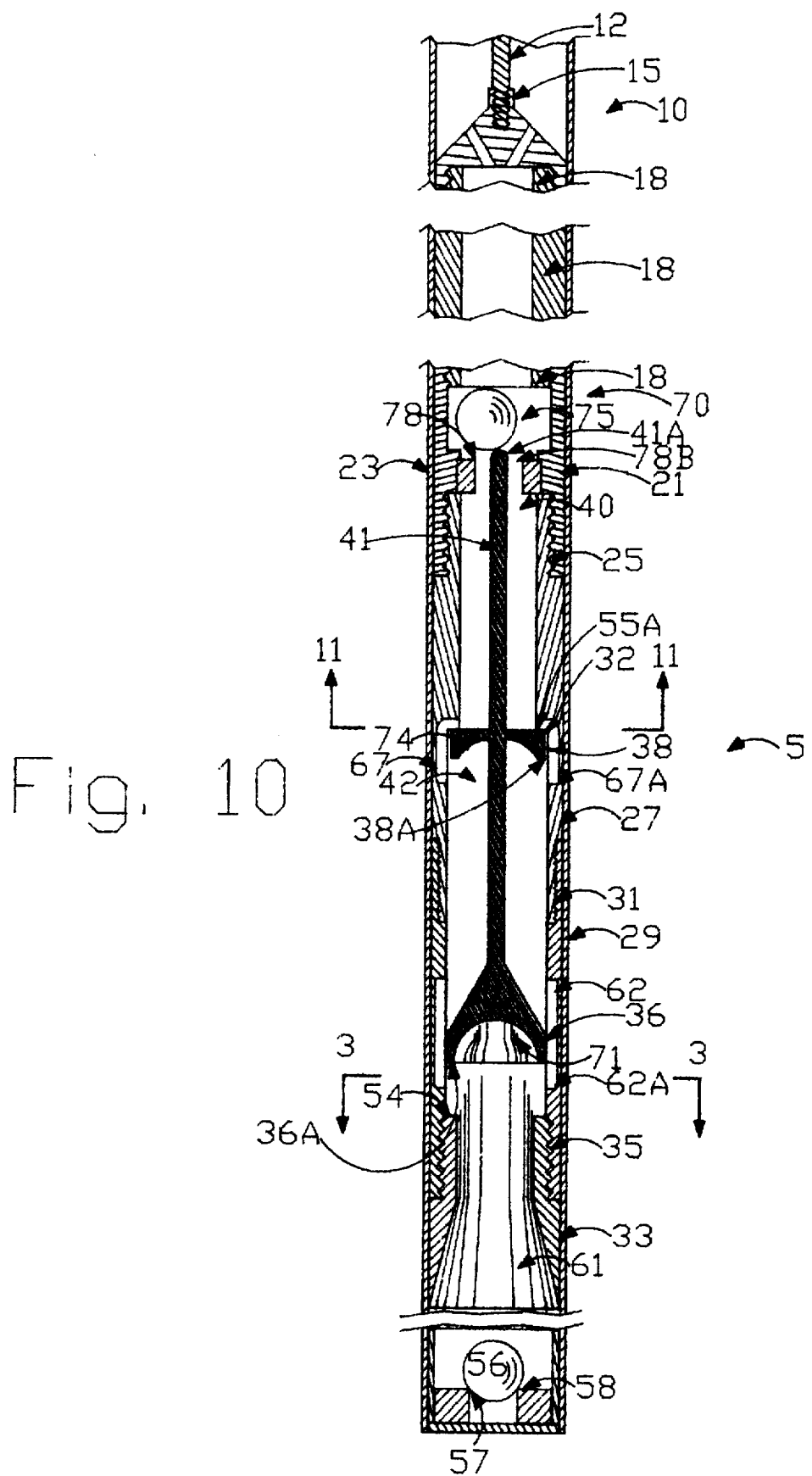
FIG. 10 shows pump 10 of FIG. 1, except that an upper sealing member 38 without flow areas 79 is utilized, and except that upper stops 55 have been replaced by upper stops 55A of housing 27.
Figure 11:
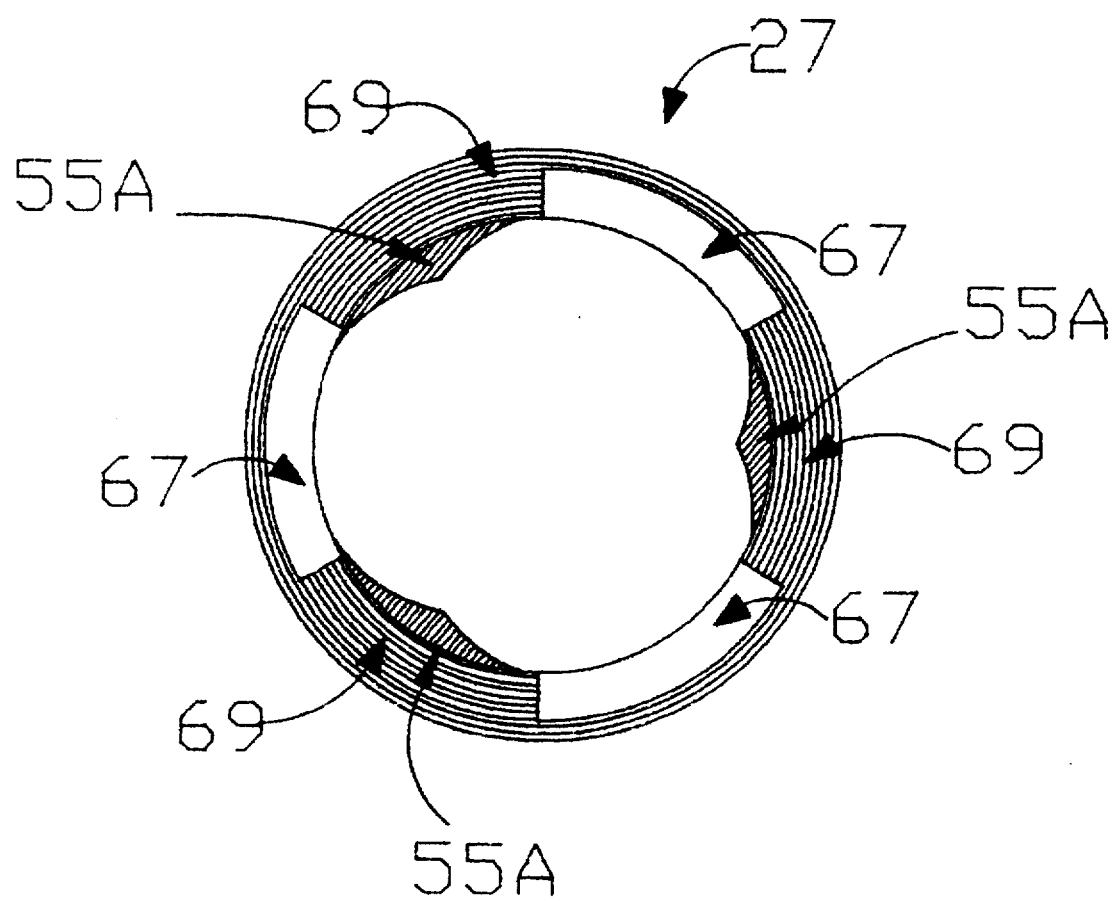
FIG. 11 is a horizontal cross-sectional view taken along FIG. 10 lines 11—11, of reciprocating fluid pump 10 of the present invention.

Referring now to FIGS. 10 and 11, there is shown still another embodiment of the present invention. The description above is applicable to FIGS. 10 and 11 for like numbers. FIG. 10 shows pump 10 of FIG. 1 above, except that an upper sealing member 38 without flow areas 79 is utilized, and except that upper stops 55 have been replaced by upper stops 55A of housing 27.

Figure 12:
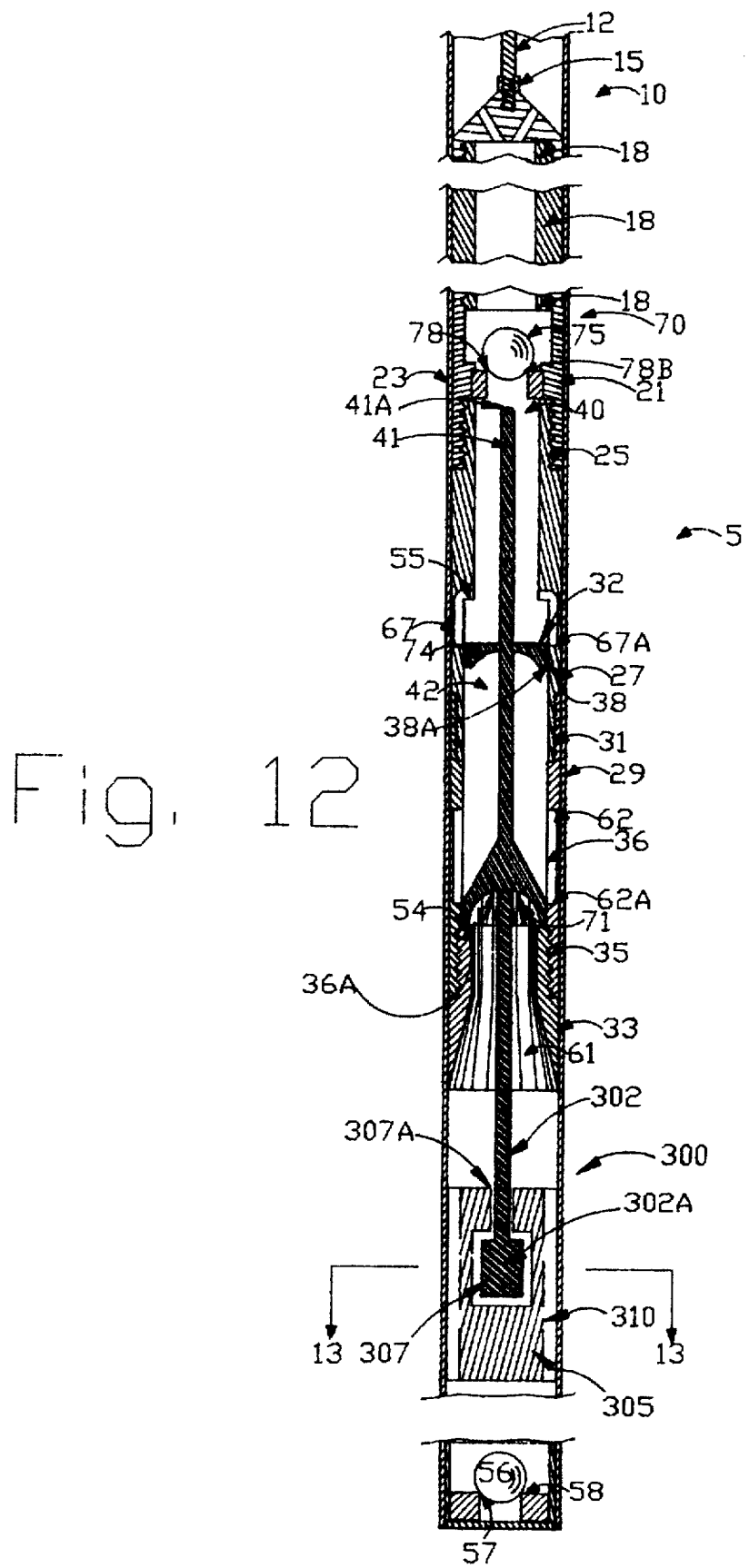
FIG. 12 shows pump 10 further having a weight system 300, which is used to further urge piston 40 from its upper to its lower position.
Figure 13:
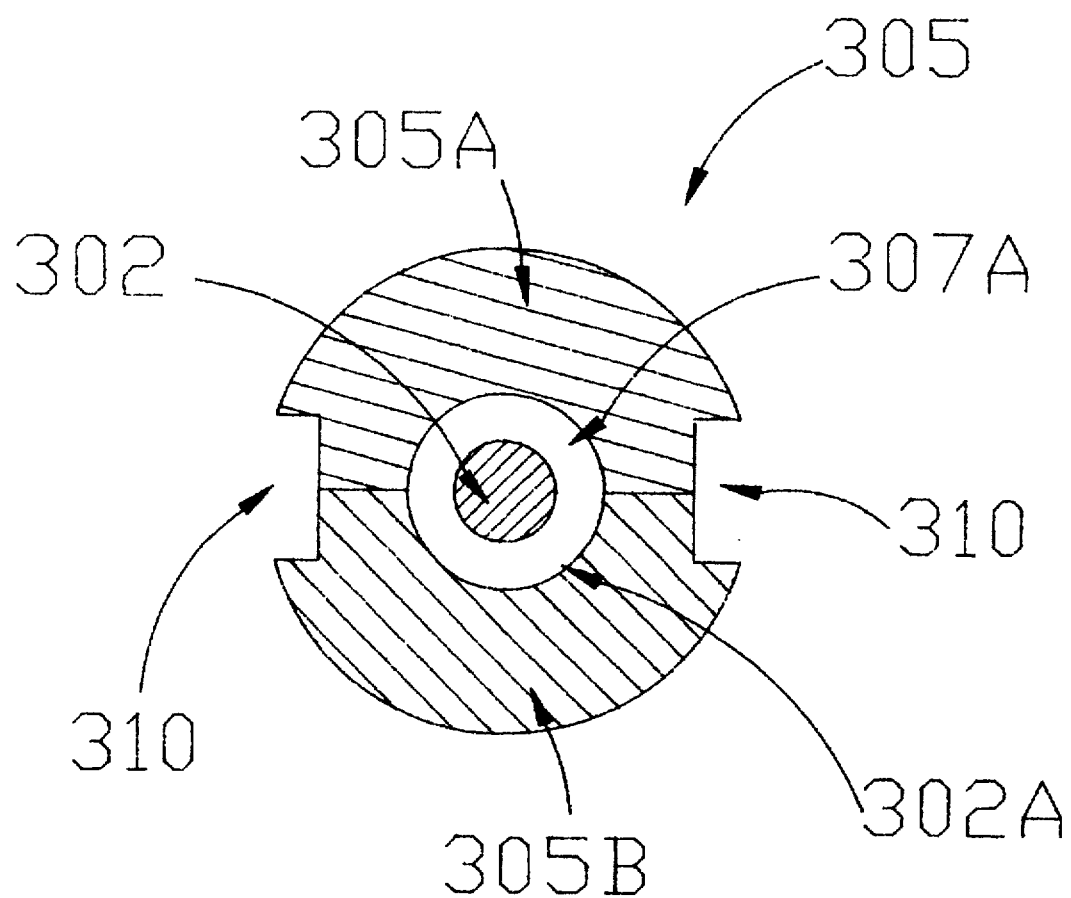
FIG. 13 is a view of weight 305 of FIG. 12, taken along FIG. 12 line 13—13, showing weight sections 305A and 305B connected around coupling end 302A.

Referring now to FIGS. 12 and 13, there is shown still another embodiment of the present invention. The description above is applicable to FIGS. 12 and 13 for like numbers. Additionally, FIG. 12 shows weight/plunger system 300, which is used to further encourage the movement of piston 40, by gravity, and downward by frictional drag during the upstroke of the pump and upward by frictional drag during the downstroke of the pump. At the very least, weight system 300 will include a weight/plunger 305 which is coupled to piston 40. This weight/plunger 305, which may be of any suitable shape to form a frictional fit with the wall of the pump barrel, and includes one or more channels 310 which allow fluid to by-pass weight/plunger 305. In the embodiment shown in FIG. 12, weight/plunger system 300 includes a connector 302, which joins piston 40 with plunger/weight 305. Coupling end 302A of connector 302 is held within chamber 307 of weight 305, with connector 302 extending through passage 307A of chamber 307. Chamber 307 is oversized with respect to coupling end 302A to allow relative movement between weight 305 and coupling end 302A. This relative movement between weight 305 and coupling end 302A absorbs some of the shock of the movement of piston 40. It is to be understood, that connector 302 could also be made with some flexibility to absorb some of this shock.

Referring now to FIG. 13, there is shown a view of weight/plunger 305 of FIG. 12, taken along FIG. 12 line 13—13. As shown in FIG. 13, weight 305 includes sections 305A and 305B, which are connected around coupling end 302A. Weight/plunger 305 fits within the pump housing, with one or more passages 310 along the side of weight/plunger 305, or alternatively through weight/plunger 305, allowing fluid to flow past weight/plunger 305.

While weight/plunger system 300 is shown in conjunction with piston 40 having modified upper sealing member 38, it is to be understood that weight/plunger system 300 may be utilized with any type of piston 40.

Figure 14:
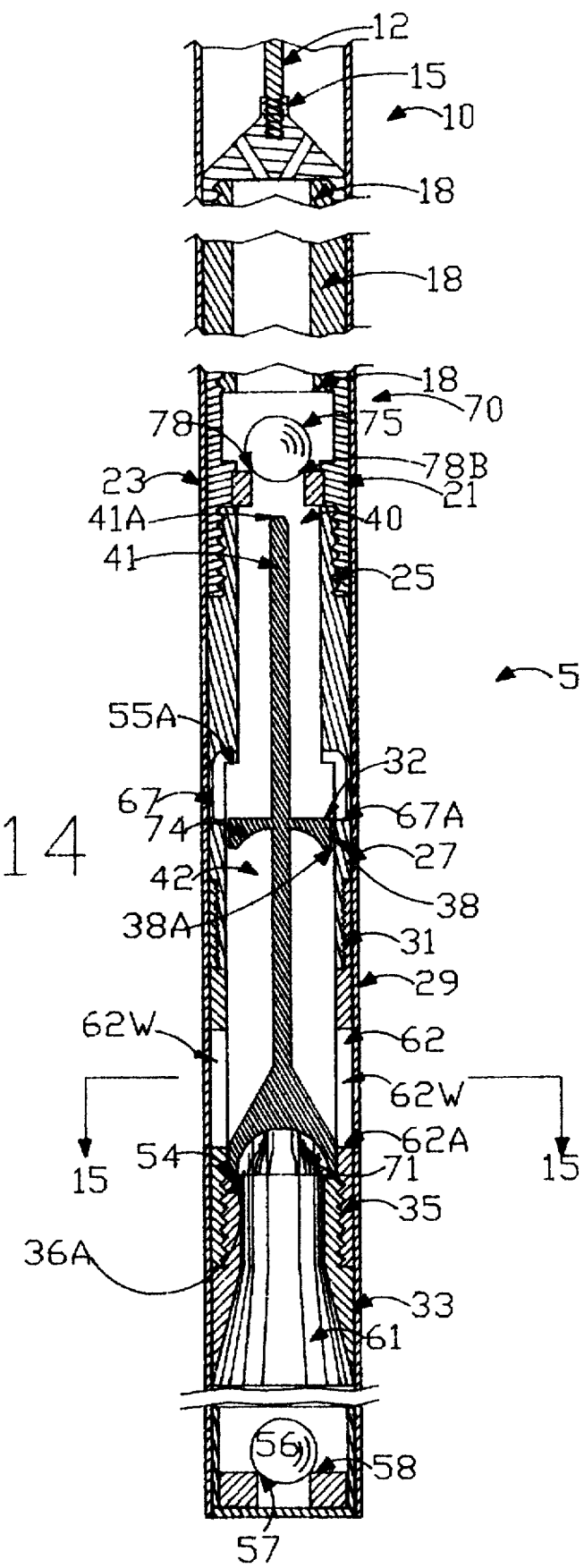
FIG. 14 is a view of pump 10, with channels 62 modified to allow for production of heavy crude oils.
Figure 15:
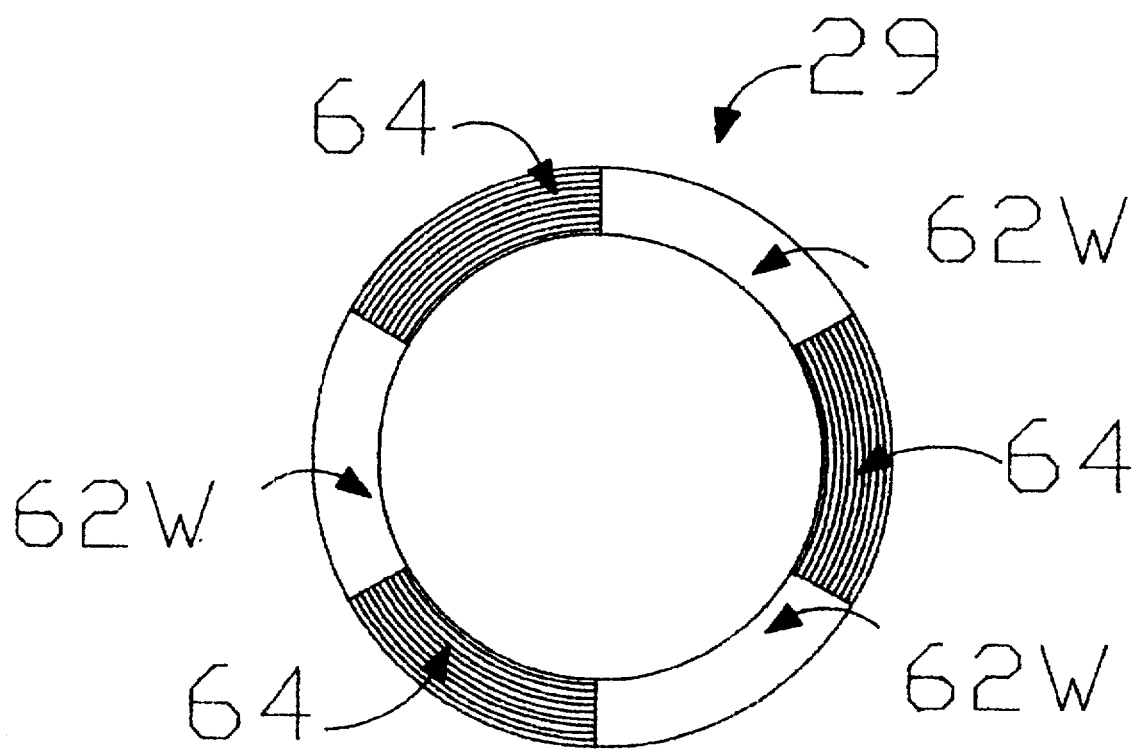
FIG. 15 is a horizontal cross-sectional view taken along FIG. 14 line 15—15, of reciprocating fluid pump 10 of the present invention.

Referring now to FIGS. 14 and 15, there is shown still another embodiment of the present invention. The description above is applicable to FIGS. 14 and 15 for like numbers. When producing heavier crude oils, it is sometime necessary to modify pump 10 to allow for flow around upper sealing member 38 and lower sealing member 36. This may be accomplished by increasing the flow areas of channels 62 and/or 67. Additionally, with heavy crudes, it is sometimes also necessary to allow the heavy crude to by-pass lower sealing member 36, even when it is in its lowermost position abutted against lower stop 54. This can be accomplished by providing a channel, or modifying existing channels, to allow the heavy crude to by-pass lower sealing member 36 when abutted against lower stop 54. For example, as shown in the embodiment of FIGS. 14 and 15, the housing wall previously shown at 62W, has been removed to widen channel 62, and allow crude to by-pass lower sealing member 36 when abutted against lower stop 54.

According to another embodiment of the present invention there is provided apparatus for inducing, causing, biasing or urging rotation of piston 40 which apparatus may include helically aligned surface indentations such as grooves, slots, troughs, threads or channels, and/or surface extensions such as fins, baffles, nubs, tabs, or threads. It is to be understood that such apparatus may be positioned anywhere along piston 40, including on the actuator 41, actuator piston body 42, and/or weight/plunger system 300.

Figure 18:
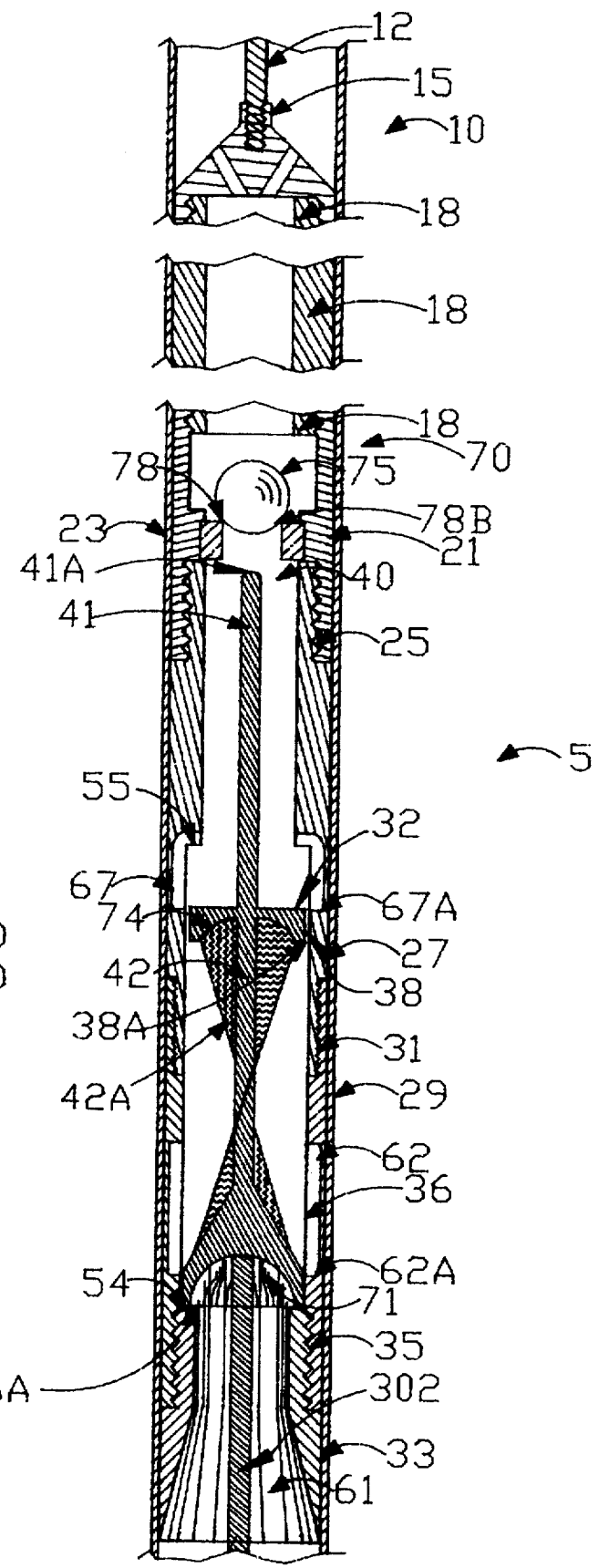
FIG. 18 is a view of pump 10 with actuator piston body 42A modified with radial fins.

An illustration of such fins or baffles is shown in FIG. 18, 19A and 19B. The description above is applicable to FIGS. 18, 19A and 19B for like numbers. Referring to FIG. 18, there is shown a view of pump 10 except that the actuator piston body 42 has been replaced by actuator piston body 42A. Instead of being smooth, actuator piston body 42A contains fins for inducing radial motion. The fins aid in the rotation of actuator piston body 42A which overcomes effects of sand on the valve action, allows for even wear of the valve 70. It is to be understood that the fins of actuator piston body 42A may be spirally shaped as shown in FIG. 18 or spiraled at any angle.

It is also to be understood that the fins or baffles may be positioned anywhere along the body of piston 40 and/or of weight/plunger system 300 suitable for inducing, causing, biasing or urging rotation.

FIG. 19A and 19B, are isometric views of piston 40, of the above illustration, showing finned actuator piston body 42A with reinforcement 42B for the upper valve.

Figure 17A:
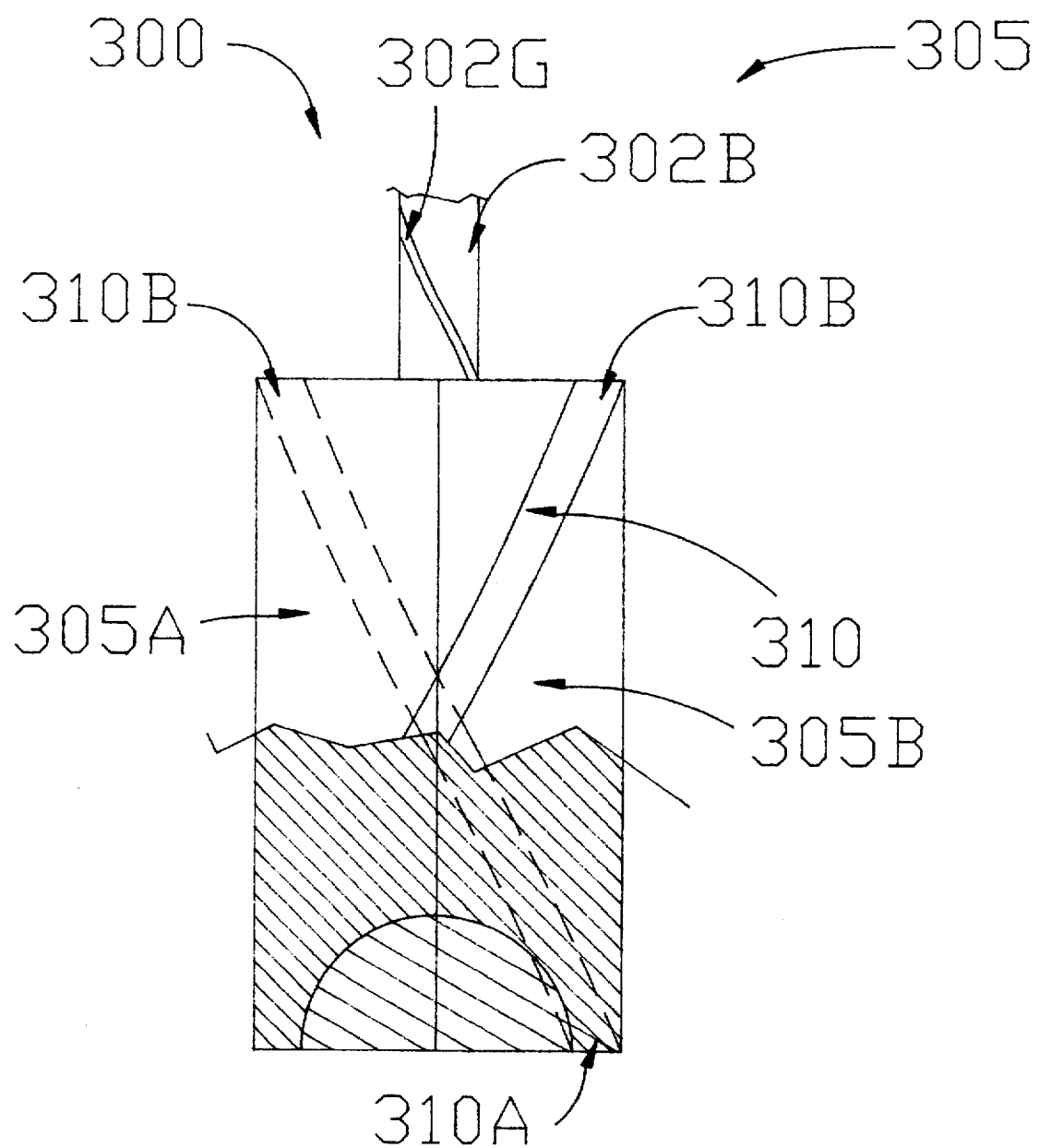
FIG. 17A is a view of weight/plunger 305 taken alnong FIG. 16 line 17A—17A showing spiral groove connector 302B, flow channels 310, fluid entrance 310A and fluid exit 310B

An illustration of such helically aligned grooves, slots, troughs or channels is shown in FIG. 16, 17A, which is a view of weight/plunger 305 taken along FIG. 16 line 17A—17A, and 17B, which is a view of weight/plunger 305 taken along FIG. 16 line 17B—17B. The description above is applicable to FIGS. 16, 17A and 17B for like numbers. Referring to FIGS. 16 and 17A there is shown the weight/plunger system 300, which is like the weight plunger/system 300 of FIG. 12, except for the following changes. First, connector 302 has been replaced by connector 302B the surface of which contains a slot, groove or channel 302G, which may be spiraled or tapered at any suitable angle or otherwise cut into the surface of the connector 302B. In addition, fluid flow channels 310 are now angled across weight/plunger 305, where fluid flows into entrance 310A and out of exit 310B. Grooves 302G and channels 310 urge rotation of actuator piston body 42 to overcome effects of sand on the valve action, strengthen the valve and allow even wear of the valve.

It is to be understood that the flow channels 310 may be cut at any suitable angle and/or depth that will function to urge rotation actuation piston body 42. It is also to be understood that such helically aligned grooves, slots, troughs or channels may be positioned anywhere along the body of piston 40, which may include the actuator 41, actuator piston body 42, and/or weight/plunger system 300, suitable for inducing, causing, biasing or urging rotation.

Additionally, FIG. 16 shows fluid outlet 307C in weight/plunger 305. Fluid outlet 307C keeps the passage clear, aiding in rotation of actuator piston body 42A.

Figure 17B:
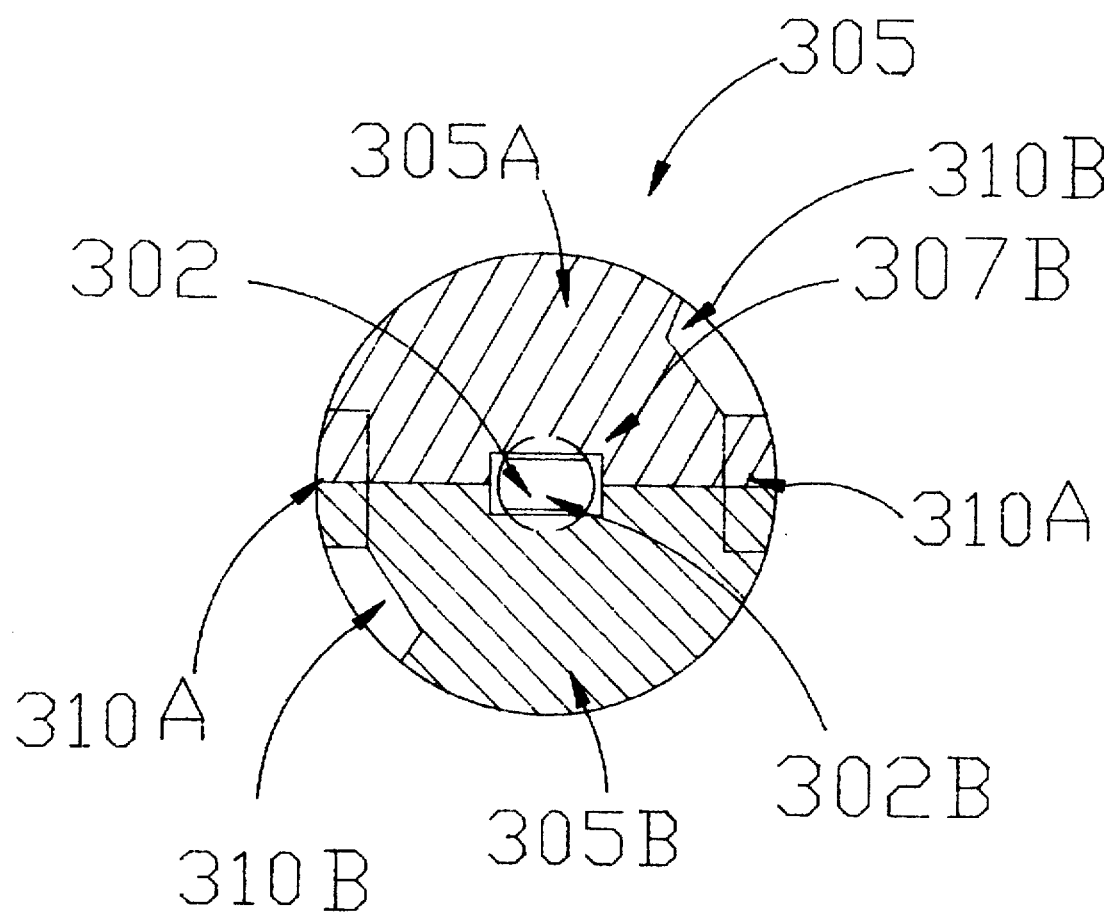
FIG. 17B is a view of weight/plunger 305 taken along FIG. 16 line 17B—17B, showing weight/plunger 305 having sections 305A and 305B.

Referring now to FIG. 17B, there is shown a view of weight plunger 305 of FIG. 16 taken along FIG. 16 at line 17B—17B. As shown in FIG. 17B, weight 305 includes sections 305A and 305B, which are connected around coupling end 302A to connector 302 or 302B and extending through guide 307B. Weight/plunger 305 fits within the pump housing with one or more flow channels 310 through weight/plunger 305 with fluid going into entrance 310A and out of exit 310B.

While one embodiment has been illustrated as having grooves for causing rotation, and another embodiment has been illustrated as having fins for causing rotation, it should be understood that an apparatus of the present invention may include both grooves and fins.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled the art to which this invention pertains.

I claim:

1. A ball and seat valve assembly comprising:
   (a) a hollow tubular member having an internal cross-sectional area;
   (b) a valve seat mounted within the tubular member, having a seating passage with a seating cross-sectional area;

(c) a ball positioned within the tubular member above the valve seat;

(d) a piston movably mounted within the tubular member below the valve seat, comprising an actuator for engaging the ball through the passage while the ball is seated on the seat, and comprising a sealing member with a sealing area for sealing the tubular member below the valve seat across the entire internal cross-sectional area of the tubular member, wherein the sealing area is greater than the seating cross-sectional area;

wherein the ball and seat valve is closed by the ball being seated on the valve seat, and opened by an increase in fluid pressure below the piston acting upon the sealing area causing the piston to rise and engage the ball with the actuator and thereby unseat the ball, and (e) rotational inducing mechanism connected to the piston for urging rotation of the piston as it rises and engages the ball.

2. The apparatus of claim 1 wherein the rotational inducing mechanism comprises at least one surface indentation on the surface of the piston.

3. The apparatus of claim 2 wherein the piston includes a weight on which at least one surface indentation, resides.

4. The apparatus of claim 1 wherein the rotational inducing mechanism comprises at least one surface extension extending from the piston.

5. The apparatus of claim 4 wherein the piston includes a weight from which at least one surface extension is extending.

6. A ball and seat valve assembly comprising:

(a) a hollow tubular member;

(b) a valve seat mounted within the tubular member, having a seating passage;

(c) a ball positioned within the tubular member above the valve seat, and having a vertical axis through its center;

(d) a piston movably mounted within the tubular member below the valve seat, comprising an actuator for engaging the ball through the passage while the ball is seated on the seat, and comprising a sealing member for sealing the tubular member below the valve seat, wherein the actuator is shaped to engage the ball asymetrically with respect to the vertical axis of the ball;

wherein the ball and seat valve is closed by the ball being seated on the valve seat, and opened by an increase in fluid pressure below the piston causing the piston to rise and asymetrically engage the ball with the actuator and thereby unseat the ball, (e) rotational inducing mechanism connected to the piston for urging rotation of the piston as it rises and engages the ball.

7. The apparatus of claim 6 wherein the rotational inducing mechanism comprises at least one surface indentation on the surface of the piston.

8. The apparatus of claim 7 wherein the piston includes a weight on which at least one surface indentation resides.

9. The apparatus of claim 6 wherein the rotational inducing mechanism comprises at least one surface extension extending from the piston.

10. The apparatus of claim 9 wherein the piston includes a weight from which at least one surface extension is extending.

11. A ball and seat valve assembly comprising:

(a) a valve seat having a seating passage with a seating cross-sectional area, and having a top and a bottom;

(b) a ball positioned above the valve seat;

(c) a hollow tubular member mounted to the bottom of the valve seat, and having an internal cross-sectional area;

(d) a piston movably mounted within the tubular member, comprising an actuator for engaging the ball through the passage while the ball is seated on the valve seat, and comprising a sealing member with a sealing area for sealing the tubular member below the valve seat across the entire internal cross-sectional area of the tubular member, wherein the sealing area is greater than the seating cross-sectional area;

wherein an increase in fluid pressure below the piston acting upon the sealing area causes the piston to rise and engage the ball with the actuator and thereby unseat the ball.

(e) rotational inducing mechanism connected to the piston for urging rotation of the piston as it rises and engages the ball.

12. The apparatus of claim 11 wherein the rotational inducing mechanism comprises at least one surface indentation on the surface of the piston.

13. The apparatus of claim 12 wherein the piston includes a weight on which at least one surface indentation resides.

14. The apparatus of claim 11 wherein the rotational inducing mechanism comprises at least one surface extension extending from the piston.

15. The apparatus of claim 14 wherein the piston includes a weight from which at least one surface extension is extending.

16. A ball and seat valve assembly comprising:

(a) a valve seat having a seating passage, and having a top and a bottom;

(b) a ball positioned above the valve seat, and having a vertical axis through its center;

(c) a hollow tubular member mounted to the bottom of the valve seat;

(d) a piston movably mounted within the tubular member, comprising an actuator for engaging the ball through the passage while the ball is seated on the valve seat, and comprising a sealing member for sealing the tubular member, wherein the actuator is shaped to engage the ball asymetrically with respect to the vertical axis of the ball;

wherein an increase in fluid pressure below the piston causes the piston to rise and engage the ball with the actuator and thereby unseat the ball, (e) rotational inducing mechanism connected to the piston for urging rotation of the piston as it rises and engages the ball.

17. The apparatus of claim 16 wherein the rotational inducing mechanism comprises at least one surface indentation on the surface of the piston.

18. The apparatus of claim 17 wherein the piston includes a weight on which at least one surface indentation resides.

19. The apparatus of claim 16 wherein the rotational inducing mechanism comprises at least one surface extension extending from the piston.

20. The apparatus of claim 19 wherein the piston includes a weight from which at least one surface extension is extending.

21. A ball and seat valve assembly comprising:

(a) an upper hollow tubular member, having a bottom end;

(b) a valve seat mounted within the upper tubular member, having a seating passage with a seating cross-sectional area;

(c) a ball positioned within the upper tubular member above the valve seat;

(d) a lower hollow tubular member, having an internal cross-sectional area, and having a top end, wherein the top end of the lower tubular member is connected to the bottom end of the upper tubular member;

(e) a piston movably mounted within the lower tubular member, comprising an actuator for engaging the ball through the passage while the ball is seated on the seat, and comprising a sealing member with a sealing area for sealing the lower tubular member across the entire internal cross-sectional area of the lower tubular member, wherein the sealing area is greater than the seating cross-sectional area;

wherein the ball and seat valve is closed by the ball being seated on the valve seat and opened by an increase in fluid pressure below the piston acting upon the sealing area causing the piston to rise and engage the ball with the actuator and thereby unseat the ball, (f) rotational inducing mechanism connected to the piston for urging rotation of the piston as it rises and engages the ball.

22. The apparatus of claim 21 wherein the rotational inducing mechanism comprises at least one surface indentation on the surface of the piston.

23. The apparatus of claim 22 wherein the piston includes a weight on which at least one surface indentation resides.

24. The apparatus of claim 21 wherein the rotational inducing mechanism comprises at least one surface extension extending from the piston.

25. The apparatus of claim 24 wherein the piston includes a weight from which at least one surface extension is extending.

26. A ball and seat valve assembly comprising:

(a) an upper hollow tubular member, having a bottom end;

(b) a valve seat mounted within the upper tubular member, having a seating passage;

(c) a ball positioned within the upper tubular member above the valve seat, and having a vertical axis through its center;

(d) a lower hollow tubular member, and having a top end, wherein the top end of the lower tubular member is connected to the bottom end of the upper tubular member;

(e) a piston movably mounted within the lower tubular member, comprising an actuator for engaging the ball through the passage while the ball is seated on the seat, and comprising a sealing member for sealing the lower tubular member, wherein the actuator is shaped to engage the ball asymetrically with respect to the vertical axis of the ball;

wherein the ball and seat valve is closed by the ball being seated on the valve seat, and opened by an increase in fluid pressure below the piston causing the piston to rise and asymetrically engage the ball with the actuator and thereby unseat the ball, (f) rotational inducing mechanism connected to the piston for urging rotation of the piston as it rises and engages the ball.

27. The apparatus of claim 26 wherein the rotational inducing mechanism comprises at least one surface indentation on the surface of the piston.

28. The apparatus of claim 27 wherein the piston includes a weight on which at least one surface indentation resides.

29. The apparatus of claim 26 wherein the rotational inducing mechanism comprises at least one surface extension extending from the piston.

30. The apparatus of claim 29 wherein the piston includes a weight from which at least one surface extension is extending.

31. A pump assembly comprising:

(a) a tubular pump barrel providing a working chamber;

(b) a movable tubular housing positioned for longitudinal reciprocal movement in the housing working chamber;

(c) a traveling valve assembly positioned in the chamber and connected to and movable with the housing, comprising a valve seat having a seating passage with a seating cross-sectional area, and comprising a ball positioned above the valve seat;

(d) a hollow tubular actuator assembly positioned within the chamber, having an internal cross-sectional area, and having a top end, wherein the top end of the tubular member is connected to the traveling valve assembly;

(e) a piston movably mounted within the actuator assembly, comprising an actuator for engaging the ball through the passage while the ball is seated on the seat, and comprising a sealing member with a sealing area for sealing the actuator assembly across the entire internal cross-sectional area of the actuator assembly, wherein the sealing area is greater than the seating cross-sectional area;

(f) a standing valve assembly secured at the bottom of the housing;

wherein upward movement of the housing is effective to draw liquid through the standing valve assembly, subsequent downward movement of the housing is effective to increase the liquid pressure between the standing valve and the piston causing the piston to rise and engage the traveling valve assembly ball with the actuator and thereby unseat the ball, (g) rotational inducing mechanism connected to the piston for urging rotation of the piston as it rises and engages the ball.

32. The apparatus of claim 31 wherein the rotational inducing mechanism comprises at least one surface indentation on the surface of the piston.

33. The apparatus of claim 32 wherein the piston includes a weight on which at least one surface indentation resides.

34. The apparatus of claim 31 wherein the rotational inducing mechanism comprises at least one surface extension extending from the piston.

35. The apparatus of claim 34 wherein the piston includes a weight from which at least one surface extension is extending.

36. A pump assembly comprising:

(a) a tubular pump barrel providing a working chamber;

(b) a movable housing positioned for longitudinal reciprocal movement in the working chamber;

(c) a traveling valve assembly positioned in the chamber and connected to and movable with the housing, comprising a valve seat having a seating passage, and comprising a ball positioned above the valve seat, wherein the ball has a vertical axis through its center;

(d) a hollow tubular actuator member positioned within the chamber, having a top end, wherein the top end of the tubular member is connected to the traveling valve assembly;

(e) a piston movably mounted within the actuator, comprising an actuator suitable for asymetrically engaging the ball through the passage while the ball is seated on the seat, and comprising a sealing member for sealing the actuator;

(f) a standing valve assembly secured at the bottom of the housing;

wherein upward movement of the housing is effective to draw liquid through the standing valve assembly, subsequent downward movement of the housing is effective to increase the liquid pressure between the standing valve and the piston causing the piston to rise and asymetrically engage the traveling valve assembly ball with the actuator and thereby unseat the ball.

(g) rotational inducing mechanism connected to the piston for urging rotation of the piston as it rises and engages the ball.

37. The apparatus of claim 36 wherein the rotational inducing mechanism comprises at least one surface indentation on the surface of the piston.

38. The apparatus of claim 37 wherein the piston includes a weight on which at least one surface indentation resides.

39. The apparatus of claim 36 wherein the rotational inducing mechanism comprises at least one surface extension extending from the piston.

40. The apparatus of claim 39 wherein the piston includes a weight from which at least one surface extension is extending.

* * * * *